United States Patent
Onofrio et al.

(10) Patent No.: US 11,520,345 B2
(45) Date of Patent: Dec. 6, 2022

(54) PATH PERCEPTION DIVERSITY AND REDUNDANCY IN AUTONOMOUS MACHINE APPLICATIONS

(71) Applicant: NVIDIA Corporation, Santa Clara, CA (US)

(72) Inventors: Davide Marco Onofrio, San Francisco, CA (US); Hae-Jong Seo, San Jose, CA (US); David Nister, Bellevue, WA (US); Minwoo Park, Saratoga, CA (US); Neda Cvijetic, East Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 171 days.

(21) Appl. No.: 16/781,893

(22) Filed: Feb. 4, 2020

(65) Prior Publication Data
US 2020/0249684 A1     Aug. 6, 2020

Related U.S. Application Data

(60) Provisional application No. 62/801,211, filed on Feb. 5, 2019.

(51) Int. Cl.
*G01C 22/00* (2006.01)
*G05D 1/00* (2006.01)
(Continued)

(52) U.S. Cl.
CPC ......... *G05D 1/0219* (2013.01); *G05D 1/0088* (2013.01); *G05D 1/0214* (2013.01);
(Continued)

(58) Field of Classification Search
CPC .. G05D 1/0219; G05D 1/0088; G05D 1/0214; G05D 1/0223; G05D 2201/0213; G06K 9/00798; G06K 9/6218; G06N 3/08
(Continued)

(56) References Cited

U.S. PATENT DOCUMENTS 7,221,797 B2    5/2007    Koshizen et al.
7,409,295 B2    8/2008    Paradie
(Continued)

FOREIGN PATENT DOCUMENTS

CN    106740457 A    5/2017
CN    106864454 A1   6/2017
(Continued)

OTHER PUBLICATIONS

International Preliminary Report on Patentability received for PCT Application No. PCT/US2020/016657, dated Aug. 19, 2021, 8 pages.
(Continued)

*Primary Examiner* — Mahmoud S Ismail
(74) *Attorney, Agent, or Firm* — Taylor English Duma LLP

(57) ABSTRACT

In various examples, a path perception ensemble is used to produce a more accurate and reliable understanding of a driving surface and/or a path there through. For example, an analysis of a plurality of path perception inputs provides testability and reliability for accurate and redundant lane mapping and/or path planning in real-time or near real-time. By incorporating a plurality of separate path perception computations, a means of metricizing path perception correctness, quality, and reliability is provided by analyzing whether and how much the individual path perception signals agree or disagree. By implementing this approach—where individual path perception inputs fail in almost independent ways—a system failure is less statistically likely. In addition, with diversity and redundancy in path perception, comfortable lane keeping on high curvature roads, under severe road conditions, and/or at complex intersections, as well as autonomous negotiation of turns at intersections, may be enabled.

20 Claims, 13 Drawing Sheets

(51) Int. Cl.
*G05D 1/02* (2020.01)
*G06N 3/08* (2006.01)
*G06K 9/62* (2022.01)
*G06V 20/56* (2022.01)

(52) U.S. Cl.
CPC ......... *G05D 1/0223* (2013.01); *G06K 9/6218* (2013.01); *G06N 3/08* (2013.01); *G06V 20/588* (2022.01); *G05D 2201/0213* (2013.01)

(58) Field of Classification Search
USPC ........................................................ 701/23
See application file for complete search history.

(56) References Cited

U.S. PATENT DOCUMENTS

| | | | |
|---|---|---|---|
| 7,565,006 | B2 | 7/2009 | Stam et al. |
| 7,724,180 | B2 | 5/2010 | Yonak et al. |
| 8,204,542 | B2 | 6/2012 | Liao et al. |
| 8,204,642 | B2 | 6/2012 | Tanaka et al. |
| 9,098,751 | B2 | 8/2015 | Hilldore et al. |
| 9,373,057 | B1 | 6/2016 | Erhan et al. |
| 9,701,307 | B1 | 7/2017 | Newman et al. |
| 9,721,471 | B2 | 8/2017 | Chen et al. |
| 10,007,269 | B1 | 6/2018 | Gray |
| 10,053,091 | B2 | 8/2018 | Jiang et al. |
| 10,108,867 | B1 | 10/2018 | Vallespi-Gonzalez et al. |
| 10,133,274 | B2 | 11/2018 | Shashua et al. |
| 10,134,278 | B1 | 11/2018 | Konrardy et al. |
| 10,137,896 | B2 | 11/2018 | Zhuang et al. |
| 10,139,831 | B2 | 11/2018 | Yan |
| 10,157,331 | B1 | 12/2018 | Tang et al. |
| 10,262,213 | B2 | 4/2019 | Chen et al. |
| 10,289,469 | B2 | 5/2019 | Fortino et al. |
| 10,363,960 | B2 | 7/2019 | Stefan et al. |
| 10,372,136 | B2 | 8/2019 | Yang et al. |
| 10,489,972 | B2 | 11/2019 | Atsmon |
| 10,580,158 | B1 | 3/2020 | Mousavian et al. |
| 10,586,456 | B2 | 3/2020 | Wang |
| 10,625,748 | B1 | 4/2020 | Dong et al. |
| 10,635,110 | B2 | 4/2020 | Shashua et al. |
| 10,730,517 | B2 | 8/2020 | Park et al. |
| 10,739,778 | B2 | 8/2020 | Winkler et al. |
| 10,740,954 | B2 | 8/2020 | Liu |
| 10,761,535 | B2 | 9/2020 | Chen et al. |
| 10,776,985 | B2 | 9/2020 | Liu et al. |
| 10,816,978 | B1 | 10/2020 | Schwalb |
| 10,829,793 | B2 | 11/2020 | Arikawa et al. |
| 10,832,439 | B1 | 11/2020 | Ma et al. |
| 10,885,698 | B2 | 1/2021 | Muthler et al. |
| 10,942,030 | B2 | 3/2021 | Haque et al. |
| 11,079,764 | B2 | 8/2021 | Nister et al. |
| 11,080,590 | B2 | 8/2021 | Smolyanskiy et al. |
| 11,099,558 | B2 | 8/2021 | Huang et al. |
| 11,210,537 | B2 | 12/2021 | Koivisto et al. |
| 2004/0252864 | A1 | 12/2004 | Chang et al. |
| 2007/0021912 | A1 | 1/2007 | Morita et al. |
| 2007/0154068 | A1 | 7/2007 | Stein et al. |
| 2007/0182528 | A1 | 8/2007 | Breed et al. |
| 2009/0125177 | A1 | 5/2009 | Tanaka et al. |
| 2009/0256840 | A1 | 10/2009 | Varadhan et al. |
| 2010/0171641 | A1* | 7/2010 | Raphael ................ G08G 1/166 340/933 |
| 2013/0325753 | A1 | 12/2013 | Sullivan et al. |
| 2014/0306844 | A1* | 10/2014 | Kim ...................... G01S 13/867 342/385 |
| 2015/0054824 | A1 | 2/2015 | Jiang |
| 2015/0346716 | A1 | 12/2015 | Scharfe et al. |
| 2016/0027176 | A1* | 1/2016 | Zeng .................. G06K 9/00798 348/148 |
| 2016/0247290 | A1 | 8/2016 | Liu et al. |
| 2016/0321074 | A1 | 11/2016 | Hung et al. |
| 2017/0010108 | A1 | 1/2017 | Shashua |
| 2017/0090478 | A1 | 3/2017 | Blayvas et al. |
| 2017/0220876 | A1 | 8/2017 | Gao et al. |
| 2017/0236013 | A1 | 8/2017 | Clayton et al. |
| 2017/0259801 | A1 | 9/2017 | Abou-Nasr et al. |
| 2017/0344808 | A1 | 11/2017 | El-Khamy et al. |
| 2017/0364083 | A1 | 12/2017 | Yang et al. |
| 2017/0371340 | A1 | 12/2017 | Cohen et al. |
| 2018/0089833 | A1 | 3/2018 | Lewis et al. |
| 2018/0107215 | A1* | 4/2018 | Djuric .................. G05D 1/0221 |
| 2018/0121273 | A1 | 5/2018 | Fortino et al. |
| 2018/0136332 | A1 | 5/2018 | Barfield, Jr. et al. |
| 2018/0158244 | A1 | 6/2018 | Ybanez Zepeda et al. |
| 2018/0173240 | A1 | 6/2018 | Fang et al. |
| 2018/0188059 | A1 | 7/2018 | Wheeler et al. |
| 2018/0189578 | A1* | 7/2018 | Yang .................. G06K 9/00798 |
| 2018/0203959 | A1 | 7/2018 | Refsnaes et al. |
| 2018/0232663 | A1 | 8/2018 | Ross et al. |
| 2018/0239146 | A1 | 8/2018 | Micks et al. |
| 2018/0251153 | A1 | 9/2018 | Li et al. |
| 2018/0267558 | A1 | 9/2018 | Tiwari et al. |
| 2018/0275657 | A1 | 9/2018 | You |
| 2018/0276278 | A1 | 9/2018 | Cagan et al. |
| 2018/0342157 | A1 | 11/2018 | Donnelly et al. |
| 2018/0348374 | A1 | 12/2018 | Laddha et al. |
| 2018/0349746 | A1 | 12/2018 | Vallespi-Gonzalez |
| 2018/0365740 | A1 | 12/2018 | Nix et al. |
| 2018/0370540 | A1 | 12/2018 | Yousuf et al. |
| 2018/0373980 | A1 | 12/2018 | Huval |
| 2019/0016285 | A1 | 1/2019 | Freienstein et al. |
| 2019/0065933 | A1 | 2/2019 | Bogdoll et al. |
| 2019/0066328 | A1 | 2/2019 | Kwant et al. |
| 2019/0071101 | A1 | 3/2019 | Emura et al. |
| 2019/0102646 | A1 | 4/2019 | Redmon et al. |
| 2019/0102668 | A1 | 4/2019 | Yao et al. |
| 2019/0129831 | A1 | 5/2019 | Goldberg |
| 2019/0147600 | A1 | 5/2019 | Karasev et al. |
| 2019/0147610 | A1 | 5/2019 | Frossard et al. |
| 2019/0171912 | A1 | 6/2019 | Vallespi-Gonzalez et al. |
| 2019/0179979 | A1 | 6/2019 | Melick |
| 2019/0213481 | A1 | 7/2019 | Godard et al. |
| 2019/0235515 | A1 | 8/2019 | Shirvani et al. |
| 2019/0250622 | A1 | 8/2019 | Nister et al. |
| 2019/0251442 | A1 | 8/2019 | Koivisto et al. |
| 2019/0258251 | A1 | 8/2019 | Ditty et al. |
| 2019/0258878 | A1 | 8/2019 | Koivisto et al. |
| 2019/0286153 | A1 | 9/2019 | Rankawat et al. |
| 2019/0310650 | A1 | 10/2019 | Halder |
| 2019/0382007 | A1 | 12/2019 | Casas et al. |
| 2019/0384304 | A1 | 12/2019 | Towal et al. |
| 2020/0013176 | A1 | 1/2020 | Kang et al. |
| 2020/0143205 | A1 | 5/2020 | Yao et al. |
| 2020/0257301 | A1 | 8/2020 | Weiser et al. |
| 2020/0293064 | A1 | 9/2020 | Wu et al. |
| 2020/0317194 | A1 | 10/2020 | Yan et al. |
| 2020/0324795 | A1 | 10/2020 | Bojarski et al. |
| 2020/0339109 | A1 | 10/2020 | Hong et al. |
| 2021/0286923 | A1 | 9/2021 | Kristensen et al. |
| 2021/0406679 | A1 | 12/2021 | Wen et al. |

FOREIGN PATENT DOCUMENTS

| | | |
|---|---|---|
| CN | 107121952 A | 9/2017 |
| CN | 111373458 A | 7/2020 |
| DE | 10 2015 221 920 A1 | 5/2017 |
| DE | 10 2015 226 762 A1 | 6/2017 |
| EP | 0717261 B1 | 12/1999 |
| EP | 1 930 863 A2 | 6/2008 |
| EP | 2 384 009 A2 | 11/2011 |
| EP | 3 171 297 A1 | 5/2017 |
| GB | 2547082 A | 8/2017 |
| KR | 2012-0009590 A | 2/2012 |
| WO | 2012/011713 A2 | 1/2012 |
| WO | 2016/183074 A1 | 11/2016 |
| WO | 2017/220705 A1 | 12/2017 |
| WO | 2018/002910 A1 | 1/2018 |
| WO | 2018/102717 A1 | 6/2018 |
| WO | 2018/147874 A1 | 8/2018 |
| WO | 2018/142394 A3 | 10/2018 |
| WO | 2018/218155 A1 | 11/2018 |

(56) References Cited

FOREIGN PATENT DOCUMENTS

OTHER PUBLICATIONS

Zang, J., Zhou, W., Zhang, G., & Duan, Z. (Nov. 2018). Traffic lane detection using fully convolutional neural network. In 2018 Asia-Pacific Signal and Information Processing Association Annual Summit and Conference (APSIPA ASC) (pp. 305-311). IEEE.
Varshney, P. K. (1997). Multisensor data fusion. Electronics & Communication Engineering Journal, 9(6), 245-253.
International Search Report and Written Opinion dated May 27, 2020 in International Patent Application No. PCT/US2020/016657.
"Euler spiral", Wikipedia, Retrieved from Internet URL : https://en.wikipedia.org/wiki/Euler_spiral, accessed on Feb. 21, 2019, pp. 10.
"F1 score", Wikipedia, Retrieved from Internet URL: https://en.wikipedia.org/wiki/F-score, accessed on Feb. 21, 2019, pp. 3.
"Polynomial curve fitting", Retrieved from Internet URL: https://www.mathworks.com/help/matlab/ref/polyfit.html, accessed on Feb. 21, 2019, pp. 13.
"Taxonomy and Definitions for Terms Related to Driving Automation Systems for On-Road Motor Vehicles", Society of Automotive Engineers (SAE), Standard No. J3016-201609, pp. 30 (Sep. 30, 2016).
"Taxonomy and Definitions for Terms Related to Driving Automation Systems for On-Road Motor Vehicles", Society of Automotive Engineers (SAE), Standard No. J3016-201806, pp. 35 (Jun. 15, 2018).
"tensorflow", Retrieved from the Internet URL :https://github.com/tensorflow/tensorflow/blob/master/tensorflow/core/kernels/hinge-loss.h, accessed on May 16, 2019, pp. 1-4.
"tf.losses.get_regularization_loss", TensorFlow Core 1.13, Retrieved from the Internet URL : https://www.tensorflow.org/api_docs/python/tf/losses/get_regularization_loss, accessed on May 16, 2019, pp. 1-1.
"tf.while_loop much slower than static graph? #9527", tensorflow, Retrieved from the Internet URL : https://github.com/tensorflow/tensorflow/issues/9527,accessed on May 16, 2019, pp. 1-7.
What is polyline?, Webopedia Definition, Retrieved from Internet URL : https://www.webopedia.eom/TERM/P/polyline.html, accessed on Feb. 21, 2019, pp. 4.
"What are deconvolutional layers?", Data Science Stack Exchange, Retrieved from Internet URL : https://datascience.stackexchange.com/questions/6107/what%E2%80%90are%E2%80%90deconvolutional%E2%80%90layers, accessed on Feb. 21, 2019, pp. 21.
Abdi, L., et al., "Driver information system: a combination of augmented reality, deep learning and vehicular Ad-hoc networks," Multimedia Tools and Applications, Kluwer Academic Publishers, Boston, US, vol. 77, No. 12, pp. 14673-14703 (Aug. 3, 2017).
Asvadi, A., et al., "DepthCN: Vehicle Detection Using 3D-LIDAR and ConvNet", International Conference on Intelligent Transportation Systems (ITSC), IEEE, pp. 1-6 (Oct. 16, 2017).
Aude, E. P. L., et al., "Integration of intelligent systems and sensor fusion within the Controlab AGV", In Mobile Robots XIV, vol. 3838, pp. 50-62 (1999).
Bach, M., et al., "Multi-camera traffic light recognition using a classifying Labeled Multi-Bernoulli filter", IEEE Intelligent Vehicles Symposium (IV), pp. 1045-1051 (Jun. 2017).
Bidlack, C., et al., "Visual Robot Navigation using Flat Earth Obstacle Projection", Proceedings Of The IEEE International Conference On Robotics And Automation, pp. 3374-3381 (1994).
Bojarski, M., et al.,"End To End Learning For Self-Driving Cars", arXiv: 1604.07316v1 [cs.CV], XP055570062, Retrieved from the Internet URL:https://nvidia.com/content/tegra/automotive/images/2016/solutions/pdf/end-to-end-dl-using-px.pdf, pp. 1-9 (Apr. 25, 2016).
Cheng, G., et al., "Automatic Road Detection and Centerline Extraction via Cascaded End-to-End Convolutional Neural Network", IEEE Transactions on Geoscience and Remote Sensing vol. 55, No. 6, pp. 3322-3337 (Jun. 1, 2017).
Chilamkurthy, S., "A 2017 Guide to Semantic Segmentation with Deep Learning", Qure.ai Blog, Retrieved from Internet URL : http://blog.qure.ai/notes/semantic-segmentation-deep-learning-review, accessed on Feb. 21, 2019, pp. 16 (Jul. 5, 2017).
Deshpande, A., "A Beginner's Guide to Understanding Convolutional Neural Networks", accessed at: https://adeshpande3.github.io/A-Beginner's-Guide-To-Understanding-Convolutional-Neural-Networks/, Accessed on Feb. 21, 2019, pp. 1-13.
Dipietro, R., "A Friendly Introduction to Cross-Entropy Loss," Version 0.1, Accessed on Feb. 21, 2019 at https://rdipietro.github.io/friendly-intro-to-cross-entropy-loss/, pp. 1-10 (May 2, 2016).
Dynov, I., "Is Deep Learning Really the Solution for Everything in Self-Driving Cars?", Retrieved from Internet URL tittps://www.automotive-iq.com/autonomous-drive/articles/deep-learning-really-solution-everything-self-driving-cars, pp. 7 (2017).
Fazlollahtabar, H., et al., "Delay Optimization in a Multiple AGV System", International Journal of Swarm Intelligence and Evolutionary Computation, pp. 7 (2014).
Garnett, N., et al., "Real-Time Category-Based and General Obstacle Detection for Autonomous Driving", IEEE International Conference On Computer Vision Workshops, pp. 198-205 (2017).
Godard, C., et al., "Unsupervised Monocular Depth Estimation with Left-Right Consistency", IEEE Computer Society Conference on Computer Vision and Pattern Recognition, pp. 270-279 (2017).
He, L., et al., "Learning Depth from Single Images with Deep Neural Network Embedding Focal Length", Cornell University Library, pp. 1-14 (Mar. 27, 2018).
Huval, B et al., "An Empirical Evaluation of Deep Learning on Highway Driving", Apr. 17, 2015, 7 pages. Available at: https://arxiv.org/pdf/Z1504.01716.pdf.
IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.
Ioffe, S., and Szegedy, C., "Batch Normalization: Accelerating Deep Network Training by Reducing Internal Covariate Shift", arXiv: 1502.03167v3 [cs.LG], pp. 1-12 (Mar. 2, 2015), Available at: https://arxiv.org/abs/1502.03167.
ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.
Jayaraman, A., et al., "Creating 3D Virtual Driving Environments for Simulation-Aided Development of Autonomous Driving and Active Safety", SAE Technical Paper, pp. 1-6 (2017).
John, V., et al., "Real-time road surface and semantic lane estimation using deep features", Signal, Image and Video Processing, vol. 12, pp. 1133-1140 (Mar. 8, 2018).
Keighobadi, J., et al., "Self-Constructing Neural Network Modeling and Control of an AGV", Positioning, pp. 160-168 (2013).
Kendall, A., et al., "End-to-end Learning of Geometry and Context for Deep Stereo Regression", Cornell University Library, pp. 66-75 (2017).
Kim, W., S., et al., "Depth Map Coding with Distortion Estimation of Rendered View", Proceedings of Spie, vol. 7543, pp. 75430B1-75430B10, (2010).
Kingma, D. P., and Ba, J. L., "Adam: A Method for Stochastic Optimization", published as a conference paper at CLR 2015, arXiv:1412.6980v9 [cs.LG], pp. 1-15 (Jan. 30, 2017).
Kokkinos, I., "Pushing the Boundaries of Boundary Detection using Deep Learning", Retrieved from the Internet JRL:http://arxiv.org/pdf/1511.07386v2.pdf, pp. 1-12(2016).
Kunze, L., et al., "Reading between the Lanes: Road Layout Reconstruction from Partially Segmented Scenes", 2018 21st International Conference on Intelligent Transportation Systems (ITSC), pp. 401-408 (Nov. 4-7, 2018).
Liu, H., et al., "Neural Person Search Machines", IEEE International Conference On Computer Vision (ICCV), pp. 493-501 (2017).
Muller, U., et al., "Off-Road Obstacle Avoidance Through End-To-End Learning". In Advances in neural information processing systems, pp. 1-8, (2006).

(56) References Cited

OTHER PUBLICATIONS

Neven, D., et al., "Towards end-to-end lane detection: an instance segmentation approach", In 2018 IEEE intelligent vehicles symposium (IV), pp. 7 (2018).
Pang, J., et al., "Cascade Residual Learning: A Two-Stage Convolutional Neural Network for Stereo Matching", IEEE International Conference on Computer Vision Workshops, pp. 887-895 (2017).
Pomerleau, D. A., "Alvinn: An Autonomous Land Vehicle In A Neural Network", In Advances in neural information processing systems, pp. 1-16, (1989).
Reiher, L., et al., "A Sim2Real Deep Learning Approach for the Transformation of Images from Multiple Vehicle-Mounted Cameras to a Semantically Segmented Image in Bird's Eye View," 23rd IEEE International Conference on Intelligent Transportation Systems (ITSC), pp. 7 (May 8, 2020).
Rothe, R., et al., "Non-maximum Suppression for Object Detection by Passing Messages Between Windows", ETH Library, pp. 1-17 (2015).
Schwarting, W., et al., "Planning And Decision-Making For Autonomous Vehicles", Annual Review of Control, Robotics, and Autonomous Systems, vol. 1, pp. 187-210, (2018).
Soylu, M., et al., "A self-organizing neural network approach for the single AGV routing problem", European Journal of Operational Research, pp. 124-137 (2000).
Stein, G. P., et al., "Vision-Based ACC With A Single Camera: Bounds On Range And Range Rate Accuracy", Proceedings Of IEEE Intelligent Vehicle Symposium, pp. 1-6 (2003).
Suorsa, R., E., and Sridhar, B., "A Parallel Implementation of a Multisensor Feature-Based Range-Estimation Method", IEEE Transactions On Robotics And Automation, pp. 1-34 (1993).
Tao, A., "Detectnet: Deep neural network for object detection in digits", NVIDIA Developer Blog, Retrieved from Internet URL: https://devblogs.nvidia.com/detectnet-deep-neural-network-object-detection-digits/, accessed on Jul. 22, 2019, p. 9 (2016).
Tateno, K., et al., "CNN-SLAM: Real-time dense monocular SLAM with learned depth prediction", Cornell University Library, pp. 6243-6252 (2017).
Tian, Y., et al., "Training and testing object detectors with virtual images," IEEE/CAA Journal of Automatica Sinica, Chinese Association of Automation (CAA), vol. 5, No. 2, pp. 539-546 (Mar. 1, 2018).
Virgo, M., "Lane Detection with Deep Learning (Part 1)", Accessed on Feb. 22, 2019 at: https://towardsdatascience.com/lane-detection-with-deep-learning-part-1-9e096f3320b7, pp. 1-10 (May 9, 2017).
Weber, M., et al., "DeepTLR: A single deep convolutional network for detection and classification of traffic lights", IEEE Intelligent Vehicles Symposium (IV), pp. 8 (Jun. 2016).
Wu, J., et al., "Automatic background filtering and lane identification with roadside LiDAR data", 2017 IEEE 20th International Conference on Intelligent Transportation Systems (ITSC), pp. 1-6 (2017).
Xie, S., and Tu, Z., "Holistically-Nested Edge Detection", Computer Vision Foundation, pp. 1395-1403 (2015).
Yang, Z., "Research on Lane Recognition Algorithm Based on Deep Learning", International Conference on Artificial Intelligence and Advanced Manufacturing (AIAM), IEEE, pp. 387-391 (2019).
Zhong, Y., et al., "Self-Supervised Learning for Stereo Matching with Self-Improving Ability", Cornell University Library, pp. 1-13 (2017).
Zitzewitz, G. V., "Survey of neural networks in autonomous driving", Survey of Neural Networks in Autonomous Driving, pp. 1-8 (2017).
"Conservative Control for Zone Driving of Autonomous Vehicles Using Safe Time of Arrival", U.S. Appl. No. 62/628,831, filed Feb. 9, 2018. **Note: Copy not provided as part of PTO records.
"Convolutional Neural Networks to Detect Drivable Freespace for Autonomous Vehicles", U.S. Appl. No. 62/643,665, filed Mar. 15, 2018. **Note: Copy not provided as part of PTO records.
"Deep Learning for Path Detection in Autonomous Vehicles", U.S. Appl. No. 62/684,328, filed Jun. 13, 2018 **Note: Copy not provided as part of PTO records.
"Deep Neural Network for Estimating Depth from Stereo Using Semi-Supervised Learning", U.S. Appl. No. 62/646,148, filed Mar. 21, 2018. **Note: Copy not provided as part of PTO records.
"Distance Based Ambient Occlusion Filter for Denoising Ambient Occlusions", U.S. Appl. No. 62/644,601, filed Mar. 19, 2018 **Note: Copy not provided as part of PTO records.
"Energy Based Reflection Filter for Denoising Ray-Traced Glossy Reflections", U.S. Appl. No. 62/644,386, filed Mar. 17, 2018 **Note: Copy not provided as part of PTO records.
"Geometric Shadow Filter for Denoising Ray-Traced Shadows", U.S. Appl. No. 62/644,385, filed Mar. 17, 2018. **Note: Copy not provided as part of PTO records.
"Method and System of Remote Operation of a Vehicle Using an Immersive Virtual Reality Environment", U.S. Appl. No. 62/648,493, filed Mar. 27, 2018 **Note: Copy not provided as part of PTO records.
"Methodology of Using a Single Controller (ECU) For a Fault-Tolerant/Fail-Operational Self-Driving System", U.S. Appl. No. 62/524,283, filed Jun. 23, 2017. **Note: Copy not provided as part of PTO records.
"Methods for Accurate Real-time Lane and Road Boundary Detection for Autonomous Driving", Provisional U.S. Appl. No. 62/636,142, filed Feb. 27, 2018. **Note: Copy not provided as part of PTO records.
"Methods for accurate real-time object detection and for determining confidence of object detection suitable for D autonomous vehicles", U.S. Appl. No. 62/631,781, filed Feb. 18, 2018 **Note: Copy not provided as part of PTO records.
"Network Injection Rate Limiting", U.S. Appl. No. 62/648,326, filed Mar. 26, 2018 **Note: Copy not provided as part of PTO records.
"Network Synchronization Using Posted Operation Tracking For Flush Semantics", U.S. Appl. No. 62/648,333, filed Mar. 26, 2018. **Note: Copy not provided as part of PTO records.
"Programmable Vision Accelerator", U.S. Appl. No. 15/141,703, filed Apr. 28, 2016. **Note: Copy not provided as part of PTO records.
"Pruning Convolutional Neural Networks for Autonomous Vehicles and Robotics", U.S. Appl. No. 32/630,445, filed Feb. 14, 2018 **Note: Copy not provided as part of PTO records.
"Reliability Enhancement Systems and Methods" U.S. Appl. No. 15/338,247, filed Oct. 28, 2016. **Note: Copy not provided as part of PTO records.
"System and Method for Autonomous Shuttles, Robo-Taxis, Ride-Sharing and On-Demand Vehicles", U.S. Appl. No. 62/635,503, filed Feb. 26, 2018. **Note: Copy not provided as part of PTO records.
"System and Method for Controlling Autonomous Vehicles", Provisional U.S. Appl. No. 62/614,466, filed Jan. 17, 2018. **Note: Copy not provided as part of PTO records.
"System and Method for Safe Operation of Autonomous Vehicles", U.S. Appl. No. 62/625,351, filed Feb. 2, 2018. **Note: Copy not provided as part of PTO records.
"System and Method for Sharing Camera Data Between Primary and Backup Controllers in Autonomous Vehicle Systems", U.S. Appl. No. 62/629,822, filed Feb. 13, 2018 **Note: Copy not provided as part of PTO records.
"System and Method for Training, Testing, Verifying, and Validating Autonomous and Semi-Autonomous Vehicles", U.S. Appl. No. 62/648,399, filed Mar. 27, 2018 **Note: Copy not provided as part of PTO records.
"System and Methods for Advanced Al-Assisted Vehicles", U.S. Appl. No. 62/648,358, filed Mar. 26, 2018. **Note: Copy not provided as part of PTO records.
"System and Methods for Virtualized Intrusion Detection and Prevent System in Autonomous Vehicles", U.S. Appl. No. 62/682,803, filed Jun. 8, 2018 **Note: Copy not provided as part of PTO records.

(56) References Cited

OTHER PUBLICATIONS

"Systems and Methods for Safe and Reliable Autonomous Vehicles", U.S. Appl. No. 62/584,549, filed Nov. 10, 2017. **Note: Copy not provided as part of PTO records.
"Video Prediction Using Spatially Displaced Convolution", U.S. Appl. No. 62/646,309, filed Mar. 21, 2018. **Note: Copy not provided as part of PTO records.
"Detection of Hazardous Autonomous Driving Using Machine Learning," U.S. Appl. No. 32/622,538, filed Jan. 26, 2018. **Note: Copy not provided as part of PTO records.
"System and method for controlling autonomous vehicles", U.S. Appl. No. 62/614,466, filed Jan. 1, 2018 **Note: Copy not provided as part of PTO records.
Adaptive Occlusion Sampling of Rectangular Area Lights with Voxel Cone Tracing, U.S. Appl. No. 32/644,806, filed Mar. 19, 2018 **Note: Copy not provided as part of PTO records.
Ching Y. Hung et al. "Programmable Vision Accelerator", U.S. Appl. No. 32/156,167, filed May 1, 2015 **Note: Copy not provided as part of PTO records.
TensorFlow Authors, "Implementation of Control Flow in TensorFlow", pp. 1-18, (Nov. 4, 2016).
"Video Prediction Using Spatially Displaced Convolution", U.S. Appl. No. 62/647,545, filed Mar. 23, 2018. **Note: Copy not provided as part of PTO records.
International Search Report and Written Opinion received for PCT Patent Application No. PCT/US2019/024400, dated Jun. 26, 2019, 11 pages.
International Search Report and Written Opinion received for PCT Patent Application No. PCT/US2019/019656, dated Jul. 24, 2019, 14 pages.
International Search Report and Written Opinion received for PCT Patent Application No. PCT/US2019/022592, dated Aug. 26, 2019, 14 pages.
International Search Report and Written Opinion received for PCT Patent Application No. PCT/US2019/035868, dated Oct. 2, 2019, 10 pages.
International Search Report and Written Opinion received for PCT Patent Application No. PCT/US2019/012535, dated Oct. 17, 2019, 20 pages.
International Search Report and Written Opinion received for PCT Patent Application No. PCT/US2019/042225, dated Oct. 18, 2019, 11 pages.
Non-Final Office Action dated Jun. 24, 2020 in U.S. Appl. No. 16/286,329, 18 pages.
International Preliminary Report on Patentability received for PCT Application No. PCT/US2019/012535, dated Jul. 16, 2020, 16 pages.
Non-Final Office Action dated Aug. 7, 2020 in U.S. Appl. No. 16/241,005, 22 pages.
International Preliminary Report on Patentability received for PCT Application No. PCT/US2019/016418, dated Aug. 13, 2020, 8 pages.
International Preliminary Report on Patentability received for PCT Application No. PCT/US2019/018348, dated Aug. 27, 2020, 16 pages.
International Preliminary Report on Patentability received for PCT Application No. PCT/US2019/019656, dated Sep. 3, 2020, 11 pages.
International Preliminary Report on Patentability received for PCT Application No. PCT/US2019/022592, dated Sep. 24, 2020, 11 pages.
International Preliminary Report on Patentability received for PCT Application No. PCT/US2019/024400, dated Oct. 8, 2020, 10 pages.
International Preliminary Report on Patentability received for PCT Application No. PCT/US2019/035868, dated Dec. 24, 2020, 8 pages.
Notice of Allowance dated Jan. 4, 2021 in U.S. Patent Application No. 16/535,440, 10 pages.
Notice of Allowance dated Jan. 19, 2021 in U.S. Appl. No. 16/286,329, 8 pages.
International Preliminary Report on Patentability received for PCT Patent Application No. PCT/US2019/042225, dated Jan. 28, 2021, 9 pages.
Notice of Allowance dated Feb. 17, 2021 in U.S. Appl. No. 16/241,005, 7 pages.
International Search Report and Written Opinion received for PCT Patent Application No. PCT/US2020/062869, dated Mar. 17, 2021, 11 pages.
Non-Final Office Action dated Sep. 3, 2021 in U.S. Appl. No. 16/409,056, 9 pages.
International Search Report Written Opinion received from PCT Application No. PCT/US2021/051286 dated Dec. 6, 2021, 17 pages.
Preinterview First Office Action dated Mar. 30, 2022 in U.S. Appl. No. 16/433,994, 24 pages.
Final Office Action dated Apr. 11, 2022 in U.S. Appl. No. 16/409,056, 16 pages.

* cited by examiner

PATH PERCEPTION DIVERSITY AND REDUNDANCY IN AUTONOMOUS MACHINE APPLICATIONS

CROSS-REFERENCE TO RELATED APPLICATIONS

This application claims the benefit of U.S. Provisional Application No. 62/801,211, filed on Feb. 5, 2019, which is hereby incorporated by reference in its entirety.

This application is related to U.S. Provisional Application No. 62/946,689, filed on Dec. 11, 2019, U.S. Non-Provisional application Ser. No. 16/535,440, filed on Aug. 8, 2019, U.S. Non-Provisional application Ser. No. 16/514,230, filed on Jul. 27, 2019, U.S. Non-Provisional application Ser. No. 16/433,994, filed on Jun. 6, 2019, U.S. Non-Provisional application Ser. No. 16/409,056, filed on May 10, 2019, U.S. Non-Provisional application Ser. No. 16/378,188, filed on Apr. 8, 2019, U.S. Non-Provisional application Ser. No. 16/286,329, filed on Feb. 26, 2019, and U.S. Non-Provisional application Ser. No. 16/241,005, filed on Jan. 7, 2019, each of which is hereby incorporated by reference in its entirety.

BACKGROUND

The ability to correctly perceive the structure of lanes along a driving surface—and/or to perceive a drivable path there through—is critical for achieving an acceptable level of safety in autonomous machine applications at all levels of autonomy. For example, an autonomous or semi-autonomous vehicle may perceive: a single path that enables lane-keeping functionality; adjacent paths in support of lane change functionality and/or negotiating driving features such as road forks, turns, cloverleaf interchanges, and merges; and/or an overall lane structure of a current lane of travel and/or one or more adjacent lanes in order to account for potential trajectories of surrounding objects—such as vehicles, pedestrians, bicyclists, or the like.

Conventional approaches to path perception and/or lane structure computations have relied on a single data source. For example, some conventional approaches rely on the output of a single deep neural network (DNN) that is trained to detect and compute locations of lane lines—which by extension may enable the determination of a drivable path there through. Another example includes the use of a trajectory output signal generated from a high-definition (HD) map. In either example, a single output signal corresponding to a perceived path may be relied upon for controlling an autonomous vehicle. However, obtaining a real-time metric on path perception correctness with a single path perception input signal is not feasible, since measuring and comparing the path perception accuracy of a single signal requires a volume of computing that is impractical to perform in real-time—and thus requires offline comparison to ground truth datasets. As such, because it may not be possible to verify the reliability of the path perception signal, the autonomous vehicle system may rely on inaccurate information when the path perception input fails—thereby leading to disengagement of autonomous driving functionality in some examples. The risk of failure is even further increased in challenging scenarios such as high curvature roads, poor or severe road conditions, or multi-way intersection negotiation. In addition, even where the path perception signal is not entirely inaccurate, the use of a single path perception signal may cause the system to perform poorly on other autonomous driving metrics, such as metrics for passenger comfort and/or smoothness in executing vehicle maneuvers.

SUMMARY

Embodiments of the present disclosure relate to path perception diversity and redundancy in autonomous machine applications. Systems and methods are disclosed for path perception and lane mapping using a plurality of input signals from deep neural networks (DNNs), high-definition (HD) maps, and/or object traces from one or more objects in the environment. As a result, real-time assessment of path perception quality and reliability may be determined, and a lane mapping and/or path computation may be generated by leveraging a diverse set of path perception input signals.

In contrast to conventional systems, such as those described above, an ensemble of path perception approaches are collectively leveraged to produce a more accurate and reliable understanding of a driving surface and/or a path there through. For example, where a single path perception input may be inaccurate, an analysis of a plurality of path perception inputs provides testability and reliability for accurate and redundant lane mapping and/or path planning in real-time or near real-time. Specifically, through agreement/disagreement analyses of different path perception signal components, reliably metricizing path perception results live in an autonomous or semi-autonomous vehicle becomes possible—while also enabling a higher overall quality of path perception results.

As such, incorporating a plurality of separate path perception computations provides a means of metricizing path perception correctness, quality, and reliability by analyzing whether and how much the individual path perception signals agree or disagree. By implementing this approach—where individual path perception inputs fail in almost independent ways—a system failure is less statistically likely. In addition, with diversity and redundancy in path perception, advanced functionalities—such as comfortable lane keeping on high curvature roads or under severe road conditions, and/or at complex intersections—as well as autonomous negotiation of turns at intersections may be enabled. Using the approaches described herein, mean autonomous distance ("MAD," the average distance driven between autonomy disengagement events) may be increased and a way to estimate confidence of path perception correctness may be achieved—which in turn may allow for diversity and redundancy for safety, as well as higher precision and comfort for autonomous or semi-autonomous driving functionality.

BRIEF DESCRIPTION OF THE DRAWINGS

The present systems and methods for path perception diversity and redundancy in autonomous machine applications are described in detail below with reference to the attached drawing figures, wherein.

DETAILED DESCRIPTION

Systems and methods are disclosed related to path perception diversity and redundancy in autonomous machine applications. Although the present disclosure may be described with respect to an example autonomous vehicle 700 (alternatively referred to herein as "vehicle 700", "ego-vehicle 700", or "autonomous vehicle 700," an example of which is described with respect to FIGS. 7A-7D, this is not intended to be limiting. For example, the systems and methods described herein may be used by, without limitation, non-autonomous vehicles, semi-autonomous vehicles (e.g., in one or more adaptive driver assistance systems (ADAS)), robots, warehouse vehicles, off-road vehicles, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to autonomous driving, semi-autonomous, or ADAS systems, this is not intended to be limiting. For example, the systems and methods described herein may be used in a simulation environment (e.g., to test accuracy of machine learning models during simulation), in robotics, aerial systems, boating systems, and/or other technology areas, such as for perception, world model management, path planning, obstacle avoidance, and/or other processes.

Figure 1:
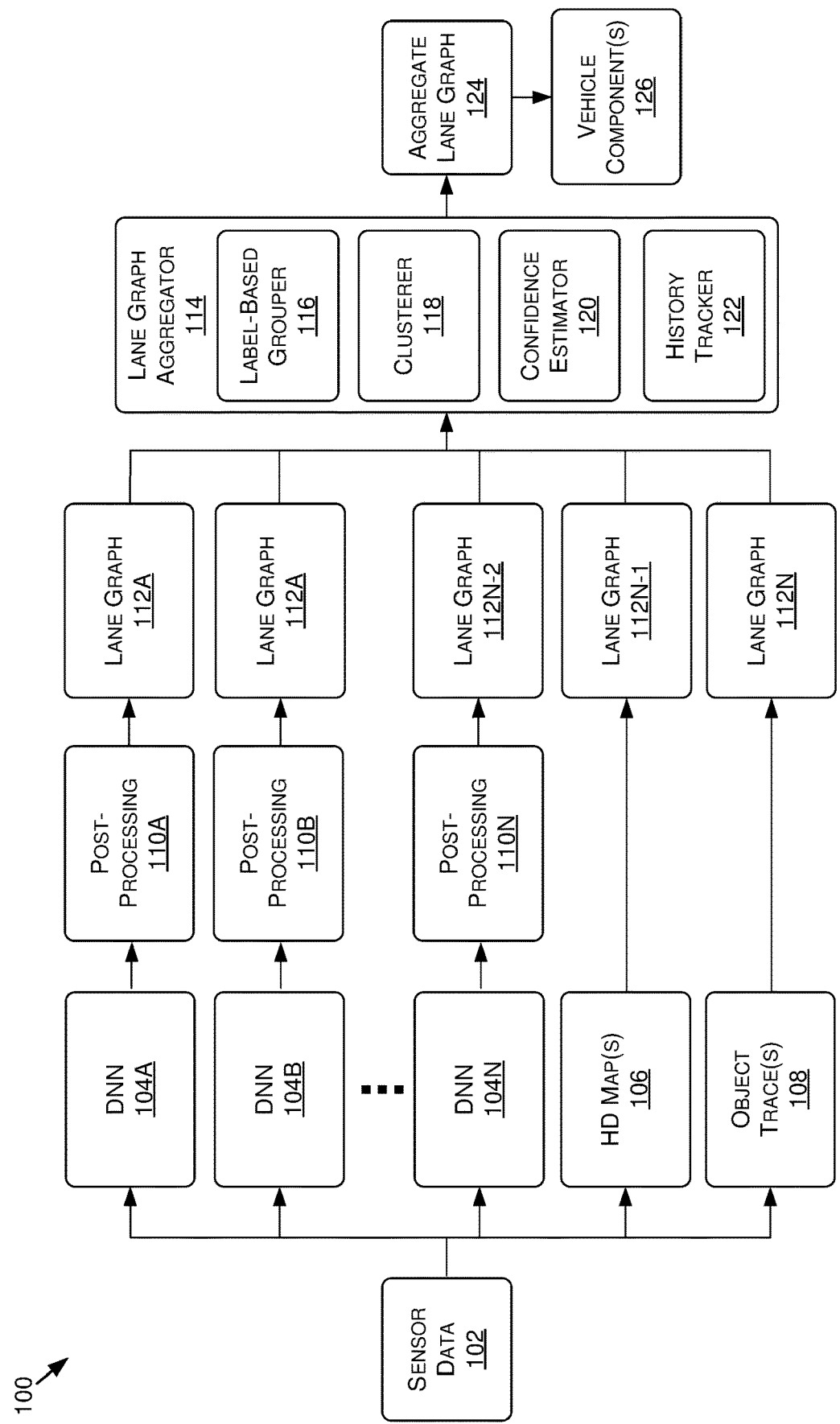
FIG. 1 is a data flow diagram for an example process of generating an aggregate lane representation from a plurality of individually generated lane representations, in accordance with some embodiments of the present disclosure.

With reference to FIG. 1, FIG. 1 depicts a data flow diagram for a process 100 of generating an aggregate lane representation from a plurality of individual generated lane representations, in accordance with some embodiments of the present disclosure. For example, redundancy and diversity is introduced by combining different underlying path perception signals in a way that enables real-time or near real-time assessment of path perception quality and reliability. For example, the process 100 leverages ensemble methods, which include techniques that create multiple models—e.g., lane graphs or other path or road layout representations—and combines them to produce an improved result. As such, because multiple perception sources are used, this ensemble of methods produces more accurate and reliable results than a single perception source would. As a result, not only is the accuracy of the aggregate or ensemble lane representation or lane graph able to be computed—e.g., through an agreement/disagreement analysis of the different path perception signal components—the reliability of the generated ensemble or aggregate lane representation or lane graph is also increased as compared to conventional approaches, such as those described herein.

The process 100 may include generating and/or receiving sensor data 102 from one or more sensors of the vehicle 700. In deployment, the sensor data 102 may be used by the vehicle 700, and within the process 100, to generate any number of lane graphs 112 (e.g., lane graphs 112A-112N, alternatively referred to herein as a "lane representation") that may be analyzed by a lane graph aggregator 114 to generate an aggregate lane graph 124 (alternatively referred to herein as an "ensemble lane graph", an "aggregate lane representation", and an "ensemble lane representation"). Although referred to as lane graphs herein, the lane graphs 112 and/or the aggregate lane graph 124 may include any type of path perception, lane layout, road layout, map element, driving surface structure, and/or other representation corresponding to a driving surface and/or a path of the vehicle 700, another vehicle, or another object type. In embodiments where the sensor data 102 is generated by one or more sensors of another object type—such as an aircraft, a water vessel, etc.—the lane graphs 112 and/or the aggregate lane graphs 124 may include alternate representations corresponding to the particular environment of travel of the respective object type.

The sensor data 102 may include, without limitation, sensor data 102 from any of the sensors of the vehicle 700 (and/or other vehicles or objects, such as robotic devices, VR systems, AR systems, aircraft, watercraft, etc., in some examples). For example, and with reference to FIGS. 7A-7C, the sensor data 102 may include the data generated by, without limitation, global navigation satellite systems (GNSS) sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), and/or other sensor types. Although reference is primarily made to the sensor data 102 generated by the vehicle 700, this is not intended to be limiting, and the sensor data 102 may alternatively or additionally be generated by any of the sensors of the vehicle 700, another vehicle or object type, and/or another system (e.g., a virtual vehicle in a simulated environment, a robotic system, etc.).

In some examples, the sensor data 102 may include the sensor data generated by one or more forward-facing sensors, side-view sensors, and/or rear-view sensors. This sensor data 102 may be useful for identifying, detecting, classifying, and/or tracking movement of objects around the vehicle 700 within the environment. In embodiments, any number of sensors may be used to incorporate multiple fields of view (e.g., the fields of view of the long-range cameras 798, the forward-facing stereo camera 768, and/or the forward facing wide-view camera 770 of FIG. 7B) and/or sensory fields (e.g., of a LIDAR sensor 764, a RADAR sensor 760, etc.).

The sensor data 102 may be used by any number of perception sources—such as deep neural networks (DNNs) 104 (e.g., DNNs 104A-104N), high-definition (HD) map(s) 106, object trace(s) 108, and/or other perception sources—to generate perception outputs. In some examples, such as where an HD map(s) 106 is used, the sensor data 102 may not be used (however the HD map(s) 106 may still be referred to as a perception source herein, even where the sensor data 102 is not used). In other non-limiting embodiments, the HD map(s) 106 may use the sensor data 102—such as image data—for more accurate localization within the HD map(s) 106. The perception sources may each generate one or more perception outputs that, in some non-limiting embodiments, may aid the vehicle 700 in generating an understanding of a layout or structure of the driving surface—e.g., lane locations, lane dimensions, lane curvature, etc.—and/or to determine a path through the environment along the driving surface. For non-limiting examples, the perception outputs may include—without limitation—lane graphs, lane representations, driving surface layouts, locations of lane rails (e.g., a center-line of a lane), locations of lane edges (e.g., boundaries of a lane), locations of other portions of lanes (e.g., pixels that belong to a lane, world-space coordinates that belong to a lane, etc.), dimensions of lanes, geometry of lanes, curvature of lanes, computed paths for the vehicle 700 along the driving surface (e.g., lane-keeping paths, lane change paths, turning paths, forking paths, merging paths, and/or other path types), future trajectories for the vehicle 700, classifications for rails, edges, lanes, unmarked driving surfaces, and/or paths, and/ or other perception output types. As such, the perception sources may generate outputs that correspond to the environment, and particularly to a driving surface(s) within the environment.

As described herein, the perception sources may include one or more DNNs 104. As non-limiting examples, one or more of the DNNs 104 may be similar to the machine learning models and/or DNNs described in U.S. Non-Provisional application Ser. No. 16/535,440, filed on Aug. 8, 2019, U.S. Non-Provisional application Ser. No. 16/514, 230, filed on Jul. 17, 2019, U.S. Non-Provisional application Ser. No. 16/433,994, filed on Jun. 6, 2019, U.S. Non-Provisional application Ser. No. 16/409,056, filed on May 10, 2019, U.S. Non-Provisional application Ser. No. 16/378, 188, filed on Apr. 8, 2019, U.S. Non-Provisional application Ser. No. 16/286,329, filed on Feb. 26, 2019, and/or U.S. Non-Provisional application Ser. No. 16/241,005, filed on Jan. 7, 2019, each of which is hereby incorporated by reference in its entirety. The DNNs 104 described herein may include, for example, and without limitation, any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

The perception sources may include one or more HD maps 106. The HD maps may include external and/or internal mapping systems which may be generated using sensor data, map data, and/or other data types collected over time—e.g., by one or more vehicles or other objects. The HD maps 106 may execute independently of sensors of the vehicle 700—and thus independently of the sensor data 102—and/or may leverage the sensor data 102 generated by one or more sensors of the vehicle 700 for localization and/or positioning with respect to the HD map(s) 106.

The perception sources may include one or more object trace(s) 108. The object trace(s) 108 may leverage motion of the vehicle 700—e.g., via one or more of MU sensors 766 and/or GNSS sensors 758—and/or image data generated by one or more cameras, RADAR data generated by one or more RADAR sensors 760, LIDAR data generated by one or more LIDAR sensors 764, and/or other sensor types to track and compute a trajectory of one or more other objects (e.g., vehicles) along the driving surface of the vehicle 700. For example, the object trace(s) 108 may correspond to one or more vehicles in front of, or leading, the vehicle 700. In a non-limiting example, the object trace(s) 108 may correspond to a closest leading vehicle in the ego lane (lane of travel) of the vehicle 700, and/or the closest leading vehicles in one or more adjacent lanes of travel of the vehicle 700. As such, the vehicle trace(s) 108 may leverage the paths or trajectories of other vehicles along the driving surface to aid in determining a lane graph 112N corresponding to the road or driving surface.

In some embodiments, one or more of the perception outputs from the DNNs 104 may undergo post-processing 110 (e.g., post-processing 110A-110N). For example, post-processing 110 may include temporal smoothing or other temporal post-processing by which historical computations—e.g., perception outputs—of each respective DNN(S) 104 are maintained and fused or leveraged to generate an updated, weighted, and/or longer temporal-based output that may be more stable than individual computations at each iteration. For example, a current computation or prediction of a DNN(S) 104 may be weighed against one or more past computations or predictions of the DNN(S) 104 to generate an updated current prediction that relies on the historical information. As a result, the updated current prediction may be smoother, and thus may result in more consistent, accurate, and smooth outputs of the DNN for use in generating the lane graphs 112.

The perception outputs from the perception sources—e.g., the (post-processed) outputs of the DNNs 104, the outputs of the HD map(s) 106, and/or the outputs of the object trace(s) 108—may be used to generate the lane graphs 112. An important aspect of the present disclosure is the independence among the different individual lane graphs that are generated and applied as inputs to lane graph aggregator 114. This independence enables, at least in part, the diversity and redundancy feature that supports real-time or near real-time metrication of aggregate lane graph 124 output by the lane graph aggregator 114 (and/or DNN 502 of FIG. 5), as well as increased quality and robustness of the aggregate lane graph 124 itself. As an example, for the lane graphs 112N-1 generated from the HD map(s) 106 and the lane graphs 112N-2 generated from the object trace(s) 108, these two perception sources of information are completely different and independent as compared to the DNNs 104, and thus these lane graphs 112 will also be independent both with respect to each other and with respect to the lane graphs 112 generated using the DNNs 104. In such an example, the lane graph 112N-1 may be generated using data from an external offline mapping system while the lane graph 112A may be generated via live perception of the DNN(S) 104A. Moreover, in the example of the lane graph 112N-2, since the sensor data 102 may be combined across multiple sensors (e.g., RADAR, IMU, GNSS, camera, etc.) rather than just a camera, a large degree of independence may be introduced between the lane graph 112N-2 and the lane graph 112A generated using—for example—an image data only DNN(S) 104A.

In addition, the lane graphs 112A-112N generated by the DNNs 104A-104N may be largely independent as a result of the underlying training data used to train the DNNs 104, the type of sensor data 102 applied as input to the DNNs 104, and/or the type or format of the perception output of the DNNs 104. For example, a first output from a first DNN(S) 104 may include a location and classification of lane edges or rails, while a second output from a second DNN(S) 104 may include a recommended trajectory along a driving surface—which may be independent of any actual lanes on the driving surface. In such an example, to further illustrate the independence even within different outputs of the DNNs 104, the first DNN(S) 104 may be trained using image data having corresponding ground truth annotations generated using LIDAR data, and the second DNN(S) 104 may be trained using video data of trajectories driven by human drivers through varying environments and along varying driving surfaces.

A corollary of such independence between the varying perception sources used for generating the lane graphs 112 is that the failure modes of the different perception source are also different and largely independent from one another. For example, whereas one of the DNNs 104 may fail (e.g., by producing inaccurate inferences or lack thereof) when a front leading vehicle is very close to the vehicle 700 and/or the overall traffic conditions are quite congested, another DNN(S) 104 may not have this issue at all—e.g., based on the type of training data used and/or the types of output the DNN(S) 104 is trained to predict. As another example, where one DNN(S) 104 may not be sufficiently accurate when one or more lane markings on the driving surface are occluded—e.g., due to vehicles, objects, weather, etc.— another DNN(S) 104 may be resilient to this failure mode because it does not rely on lane markings to generate an output. As a result, due to the diversity and redundancy created by such independent failure modes, the proposed approach may avoid system failures in each of these situations by selecting and/or relying more heavily on the appropriate perception outputs—while disregarding the failed components, in some embodiments.

Each of the (post-processed, in embodiments) perception outputs may be used to generate a lane graph 112. For example, the lane graphs 112A-112N may each be generated in a same coordinate space—such as a top-down view world-space coordinate system in two-dimensions (2D) or three dimensions (3D) with an origin corresponding to the vehicle 700 (e.g., a front most point of the vehicle 700, a center of an axle of the vehicle 700, and/or another location on the vehicle 700 in world-space), a 2D image space coordinate system (e.g., denoted by pixel locations), and/or another coordinate system in world-space and/or image space. However, because each of the perception sources may generate perception outputs in different formats—e.g., locations of lane rails, locations of lane edges, classifications of the lane lines, locations of trajectories of leading vehicles, locations of recommended paths, and/or other formats—and in different coordinate systems in image space, world-space, 2D, 3D, etc., the conversion between at least some of the perception outputs and the corresponding lane graphs 112 may be unique.

To generate the lane graphs 112, produced perception output may be converted into a set of polylines—which may be labeled or classified according to their associated lane and/or lane line type, such as left edge, right edge, lane rail, etc.—which may be termed a lane graph. However, as described herein, this is not intended to be limiting, and the lane graphs 112 may include additional or alternative lane or road representations without departing from the scope of the present disclosure. In order to execute the conversion, the intrinsic and/or extrinsic parameters of the sensors that generated the sensor data 102 may be taken into account to determine locations of points of the polylines for the respective lane graphs 112. For example, where the lane graphs 112 are generated in 3D world space, for a perception output of a DNN(S) 104 that uses image data to compute 2D image space pixel coordinates corresponding to locations of lane edges, the intrinsic and/or extrinsic parameters of the camera (s) that generated the image data may be analyzed to determine a conversion from the 2D image space pixel coordinates to 3D world-space coordinates for generating the lane graph 112. Points of the polylines may be generated at increments with respect to the origin point of the lane graph and a long a longitudinal direction (e.g., a direction of travel of the vehicle 700), such as, without limitation, every twenty-five centimeters, every fifty centimeters, every meter, every foot, every two feet, every three meters, etc. As a result, the combination of the points, when connected in sequence, may form the polylines of the lane graphs 112.

In addition to generating the polylines that correspond to the lane graphs 112, each polyline of each lane graph 112A-112N may have an associated label or line classification assigned thereto. For example, the labels or line classifications may include one or more of: lane keep path (e.g., defined as the center of the lane of travel of the vehicle 700); fork left path, fork right path, merge from left path (e.g., defined as the vehicle 700 entering into a merge from the left); merge right path (e.g., defined as the vehicle 700 entering in a merge from the right); lane change left path; lane change right path; adjacent left path or rail; adjacent left divider or edge; adjacent right path or rail; and/or adjacent right divider or edge. As such, the labels or classifications may include paths or rails for staying in-lane, changing lanes, merging, taking a fork, etc., and/or paths or rails for adjacent lanes (e.g., immediately adjacent lanes to the vehicle 700, lanes that are two or more lanes adjacent the vehicle 700, etc.). The labels or classifications may thus belong to various sets, S: $S_1$={ego lane, left lane, right lane}; $S_2$={center lane or rail, divider or edge}; $S_3$={fork left, fork right}; $S_4$={lane change left, lane change right}; and so on. In some embodiments, the labels or classifications may include permutations between individual labels belongs to two or more sets, such as sets $S_1$ and $S_2$, for example.

To determine the labels or classifications for the varying lane graphs 112 generated from the varying perception sources, any suitable method may be used. As an example, labels or classifications corresponding to the individual perception sources may be used to generate the labels or classifications for the lane graphs 112. In such an example, where an output of the HD map(s) 106 includes locations of lane edges with corresponding labels, for example, these labels may be carried over to the polylines of the corresponding lane graph 112N-1. In other non-limiting embodiments, the labels or classifications may be determined after each of the lane graphs 112 are generated using distances or other geometric calculations between polylines of the varying lane graphs 112. For example, each of the polylines within a threshold distance to one another may be grouped together, and the group of polylines may be analyzed in view of a location of the polylines with respect to the vehicle 700 (or the origin) to determine an appropriate label or classification for the group of polylines. In such an example, this process may be used to assign the labels or classifications to the polylines of each of the lane graphs 112. In some examples, a combination of two or more label or classification assignment processes may be executed. For example, where some of the perception sources generate labeled or classified outputs, and other perception sources do not, the distances or geometry relationships between different polylines may be used to attribute classifications from the labeled or classified outputs to the unlabeled or unclassified outputs. In any example, the polylines of each of the lane graphs 112A-112N may be assigned labels using one or more methods to aid the lane graph aggregator 114 (or the DNN 502 of FIG. 5) in generating the aggregate lane graph 124 (e.g., the labels or classifications may be used to determine relationships between polylines across different lane graphs 112 in order to determine accuracy, reliability, and/or to generate an aggregate polyline from the combination of the polyline constituents).

The lane graphs 112A-112N may be sent or transmitted to the lane graph aggregator 114 to generate the aggregate lane graph 124. The lane graph aggregator 114 may leverage any number of the lane graphs 112 to generate the aggregate lane graph 124 and/or one or more confidence values corresponding to thereto. For example, the confidences may be indicative of the level of agreement between the various lane graphs 112A-112N used by the lane graph aggregator 114 when generating the aggregate lane graph 124. The confidence(s) may correspond to the entire aggregate lane graph 124, to individual polylines within the aggregate lane graph 124, to segments or portions of the individual polylines, and/or to other portions or segments of the aggregate lane graph 124.

In some non-limiting embodiments, the lane graph aggregator 114 may include a label-based grouper 116, a clusterer 118, a confidence estimator 120, and/or a history tracker 122. The label-based grouper 116 may group the polylines from the various lane graphs 112A-112N according to their labels or line classifications. For example, each polyline from each of the lane graphs 112A-112N that corresponds to a given label (e.g., ego center lane, right adjacent rail, left fork path, etc.) may be retrieved, or selected and grouped together. Once a group of polylines with the same labels is created, or identified, a distance(s) between the polylines inside the group may be computed. As a non-limiting example, distances between each pair of polylines from the group may be computed. The distance computation may take on any of a variety of mathematical forms, without departing from the scope of the present disclosure. In some embodiments, each polyline within the group may be fitted with a cubic polynomial which may then be used to find a common range (CR), as shown in FIG. 2.

Figure 2:
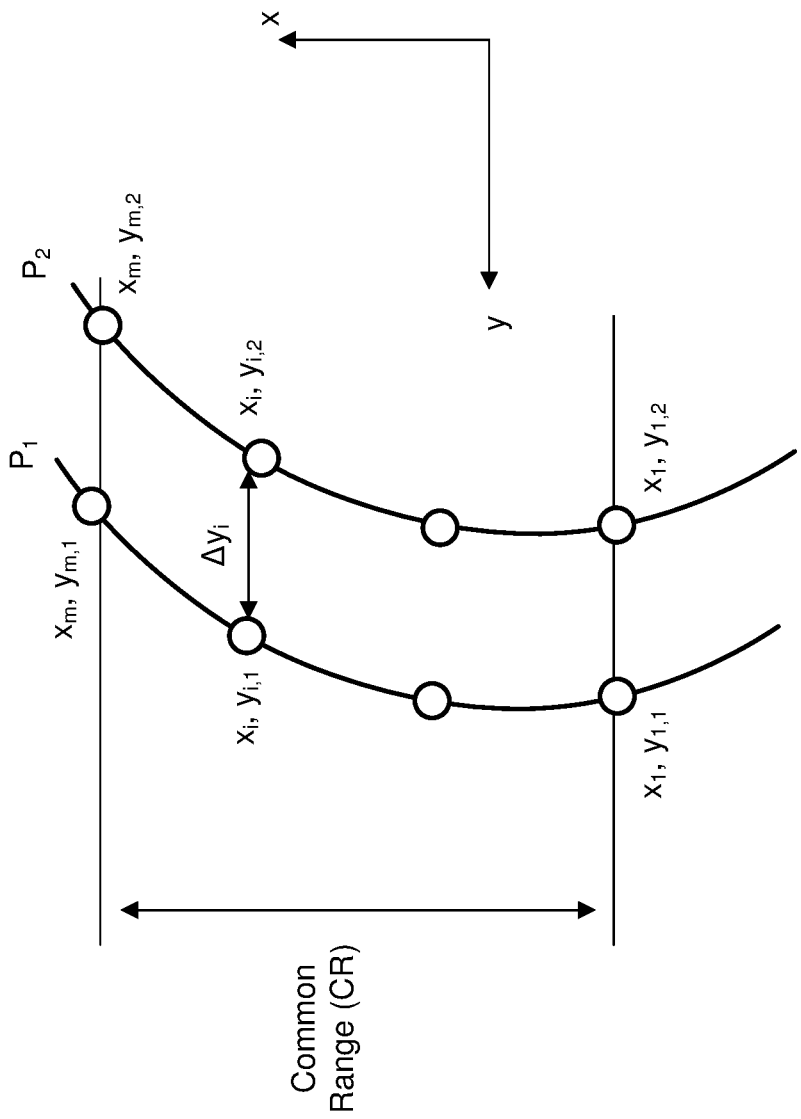
FIG. 2 is an example illustration of computing a difference between two polylines, in accordance with some embodiments of the present disclosure.

For example, with reference to FIG. 2, FIG. 2 is an example illustration of computing a difference between two polylines, in accordance with some embodiments of the present disclosure. Polyline $P_1$ and polyline $P_2$ are example polylines from a same group (e.g., $P_1$ may correspond to a polyline corresponding to a rail of the lane of the vehicle 700 from a first lane graph 112 and $P_2$ may correspond to a polyline corresponding to a rail of the lane of the vehicle 700 from a second lane graph 112). As illustrated in the example of FIG. 2, the CR may be mathematically defined according to the interval of equation (1), below:

$$CR=[x_1, x_m] \quad (1)$$

where $x_1=\min(x_i)$, i=1, ..., m that belongs to both $P_1$ and $P_2$ and $x_m=\max(x_i)$, i=1, ..., m that belongs to both $P_1$ and $P_2$. As such, to compute the distance between $P_1$ and $P_2$, the polylines may be resampled to a common sampling rate over the computed common range, and the distance may then be calculated, for each point $y_i$, i=1, ..., m, according to equation (2), below:

$$\Delta y_i = |y_{i,2} - y_{i,1}| \quad (2)$$

where ∥ denotes absolute value. The final distance between $P_1$ and $P_2$ may then be computed as the average of the $\Delta y_i$ values, E[$\Delta y_i$], i=1, ..., m, where E[ ] denotes the expected (e.g., average) value. In some embodiments, where the 3D curvature or profile of the road is known, the road curvature or road profile parameter may be included in the computation of the CR in 3D. As a non-limiting example, the road curvature or profile may be computed as described in U.S. Provisional Application No. 62/946,689, filed on Dec. 11, 2019, which is hereby incorporated by reference in its entirety.

This distance computation may be executed or repeated for each possible pair of polylines in the group of similarly labeled polylines. Once the distance computations is completed for each pair, the clusterer 118 may apply a numerical threshold to the distance values in order to cluster the polylines based on similarity. For example, based on the thresholding operation, if a set of distance values falls within the same cluster of a given radius, the determination may be that the polylines are in agreement over the CR. As such, as a result of the clustering, there may be single element clusters (e.g., clusters composed of a single polyline) and/or multi-element clusters (e.g., clusters composed of a plurality of polylines). The multi-element clusters may indicate that a plurality of polylines (or segments thereof over the CR) are in agreement (e.g., are within a threshold similarity to one another) for the path denoted by the particular label or classification associated with the group of polylines. The threshold used for determining the cluster distance or radius may be determined empirically, using a DNN (e.g., the DNN 502 of FIG. 5), via another method, or a combination thereof.

After the clustering operation by the clusterer 118, the group of polylines with the similar labels or classifications may be divided into clusters. The clusters may then be analyzed to determine the cluster with the highest number of polylines or components—e.g., because the higher number of constituents within a cluster may correspond to a higher confidence in the path perception result. In the case of a tie—e.g., where two or more clusters have the same number of polylines, a radius of the clusters (e.g., intra-cluster variance) may be measured, and the cluster with the lowest intra-cluster variance may be selected. In some embodiments, such as to account for frame glitches (and/or issues with other sensor data representations) that may cause a clustering tie, a temporal history of aggregate lane graph 124 results may be maintained and used (e.g., referenced) to break the tie and/or to remove the single frame glitch.

Once the highest-confidence cluster has been selected or determined for a particular label or classification, another cubic fit polynomial operation may be performed using the points from the polyline components within the highest-confidence cluster to generate a final polyline corresponding to the particular label or classification. This process may be repeated, at each iteration, for each label or classification grouping of polylines to generate the final polylines of the aggregate lane graph 124. For example, for each iteration of the aggregate lane graph 124, any number of label-based groups of polylines may be analyzed by the lane graph aggregator 114 to generate final polylines corresponding to one or more of the labels or line classifications including, but not limited to: lane keep path; fork left path, fork right path, merge from left path; merge right path; lane change left path; lane change right path; adjacent left path or rail; adjacent left divider or edge; adjacent right path or rail; adjacent right divider or edge; and/or another path type.

For each final polyline, in some embodiments, confidence values may be assigned to subsets of the points of the polyline. For example, each point may include a separate confidence value, two or more points may share a confidence value, or a combination thereof. As such, individual points or segments of the final polylines may be assigned confidence values. To determine the confidence values, a determination of how many sources went into the joint fitting for the particular point or segment of the final polyline may be determined. For example, for a point or segment, if five lane graphs 112 were used as inputs to the lane graph aggregator 114, but the point or segment of a final polyline was generated using only three of the five lane graphs 112, then the confidence may be 60% (3/5) for that particular point or segment. This computation may be repeated for each point and/or each segment in order to generate and assign confidence values to the final polylines of the aggregate lane graph 124. As a result, the aggregate lane graph 124 may represent not only the layout of the road surface and/or paths there through, but may also include associated confidences along each path. As a result, where confidences are low (e.g., below a threshold, such as 50%, 40%, etc.), the vehicle 700 may disengage one or more ADAS and/or autonomous features that rely on the aggregate lane graph 124. In an autonomous driving example, the vehicle 700 may disengage autonomous functionality and hand control back to the driver when the confidence along a desired or recommended path of the vehicle 700 is below a threshold. However, because the aggregate lane graph 124 is generated from diverse and redundant perception sources, the likelihood of a disengagement event or other deactivation of ADAS, semi-autonomous, or autonomous functionality may be much less likely than with a single perception source.

In some embodiments, the history tracker 122 may be executed by the lane graph aggregator 114, such as to enforce continuity between iterations of the aggregate lane graph 124. For example, at each iteration of the sensor data 102, new and independent aggregate lane graphs 124 may be generated, with the fastest or maximum frequency being set by the fastest sensor. Sometimes in a single iteration of the sensor data 102, it may happen that multiple plausible paths are computed that do not fall within the same cluster for a given threshold. In such cases, path discontinuity may arise between successive iterations of the aggregate lane graph 124 that may result in potential control commands that would be erratic or jumpy, as the vehicle 700 tries to traverse from one path to another, discontinuous path in a short period of time.

To prevent such an occurrence, continuity between successive iterations of the aggregate lane graph 124 may be enforced using the data history tracking by the history tracker 122. For example, an 'a priori' condition may be added to the aggregate lane graph 124. In such an example, based on the resulting aggregate lane graph from a previous iteration of the sensor data 102, the confidence of the clusters computed in a current iteration may be weighed in favor of temporal (e.g., historical) continuity. For example, where two or more potentially high-confidence clusters are present in the current iteration, the high-confidence cluster that would result in the most continuous path from the prior iteration to the current iteration may be weighted more heavily. As such, the Bayesian probability, $P[E_t|E_{t-1}]$, may be maximized, where $E_t$ and $E_{t-1}$ denote the aggregate lane graph 124 outputs at times t and t−1, respectively.

In some embodiments, where an underlying disagreement is present between the various label-based groups of polylines from the lane graphs 112, when and where the disagreement took place may be generated, stored, and referenced to improve the system in the future.

The aggregate lane graph 124 may be applied as input to one or more vehicle components 126 or modules of the vehicle 700 (or the underlying autonomous, semi-autonomous, or ADAS functionality thereof) to determine and/or aid in the performance of one or more operations of the vehicle 700—e.g., path planning, world model management, automatic emergency braking, obstacle and collision avoidance, control decisions, actuation decisions, etc. For example, the vehicle component(s) 126 may include a behavior planning component and/or an object-in-path analysis component of the vehicle 700.

Figure 3A:
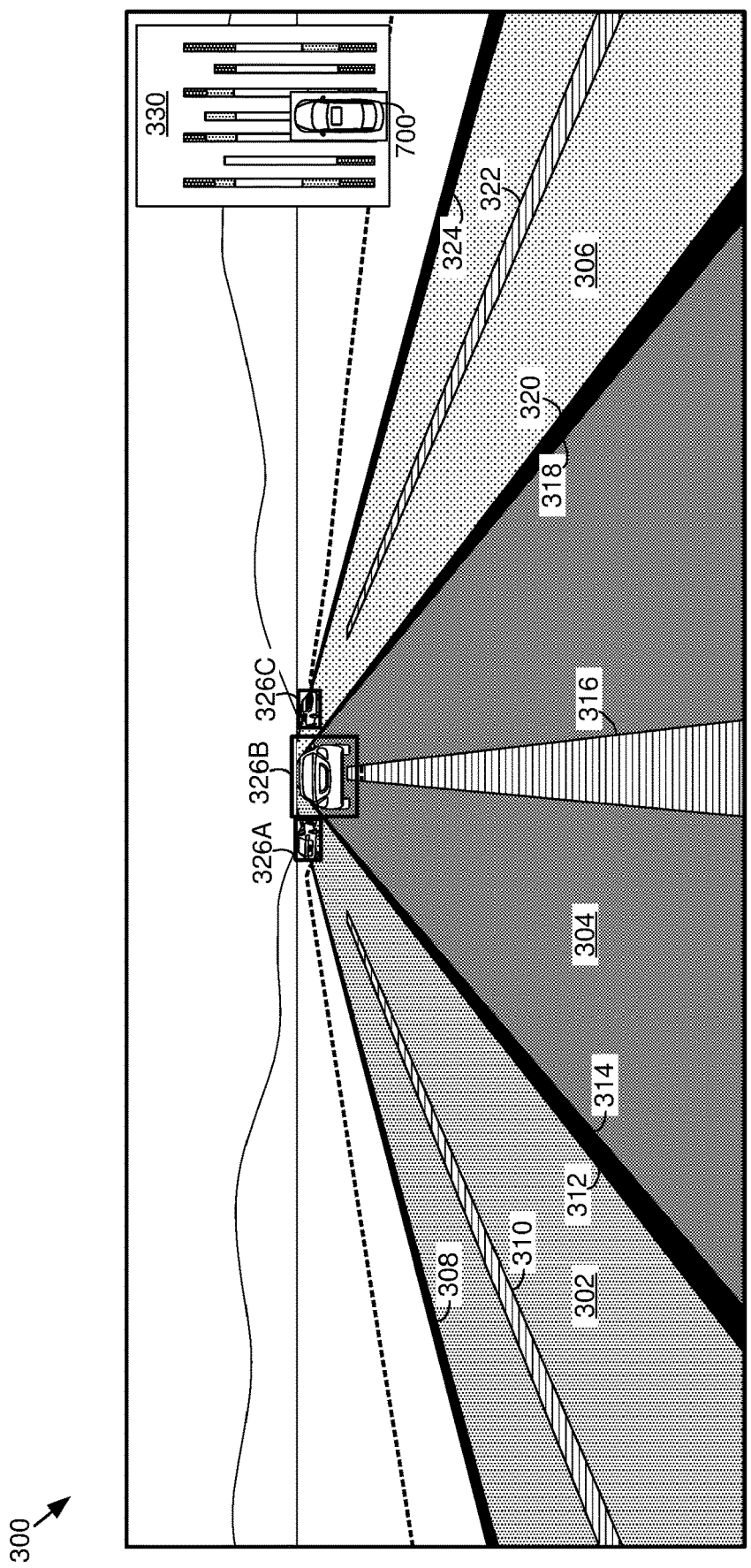
FIG. 3A is an example visualization of an aggregate lane representation with high confidence, in accordance with some embodiments of the present disclosure.

Now with reference to FIG. 3A, FIG. 3A is an example visualization 300 of an aggregate lane representation with high confidence, in accordance with some embodiments of the present disclosure. For example, the visualization 300 may represent predictions corresponding to a structure of and/or paths through lanes 302, 304, and 306. The lane 304 may represent an ego-lane (e.g., a lane of the vehicle 700), the lane 302 may represent a left adjacent lane, and the lane 306 may represent a right adjacent lane. As such, the visualization 300 may represent an iteration of an aggregate lane graph 124 generated using sensor data 102 from the vehicle 700 and/or HD map(s) 106 as the vehicle 700 traverses the environment represented by the visualization 300. The aggregate lane graph 124 of the visualization 300 may include a left adjacent lane left edge 308, a left adjacent lane rail 310, a left adjacent lane right edge 312, an ego-lane left edge 314, an ego-lane rail 316, an ego-lane right edge 318, a right adjacent lane left edge 320, a right adjacent lane rail 322, and a right adjacent lane right edge 324. In addition, the visualization includes bounding shapes 326A-326C around vehicles leading the ego vehicle 700, which may have been used to determine object trace(s) 108 for generating the lane graph(s) 112N. As described above, the visualization 300 may represent an aggregate lane graph having generally high confidences along each of the final polylines corresponding to the various lane or path labels.

Referring to chart 330, the chart 330 is representative of accuracy or confidence measures corresponding to the polylines predicted by the lane graph aggregator 114 and represented in the visualization 300. For example, each vertical bar in the chart 330 represents a single polyline over a distance (e.g., from rear of the vehicle 700 to forward of the vehicle 700) in grayscale with lighter colors indicating more accurate or confident predictions and darker colors indicating less accurate or confident predictions. As indicated by the chart 330, the majority of the chart 330 has a high to mid confidence value, indicating that the percentage of group-based polylines from the lane graphs 112 used to generate the corresponding final polylines was high (e.g., 75% or above for white, 50%-75% for gray, 50% or below for black). The darker portions near the top and bottom of each bar may indicate portions of the final polylines that are further away (and thus more difficult to predict) or to the rear of the vehicle 700 (and thus not as accurate due to less sensor data 102 being available to the rear of the vehicle and/or the perception sources not using sensor data 102 representative of the environment of the rear of the vehicle 700).

Figure 3B:
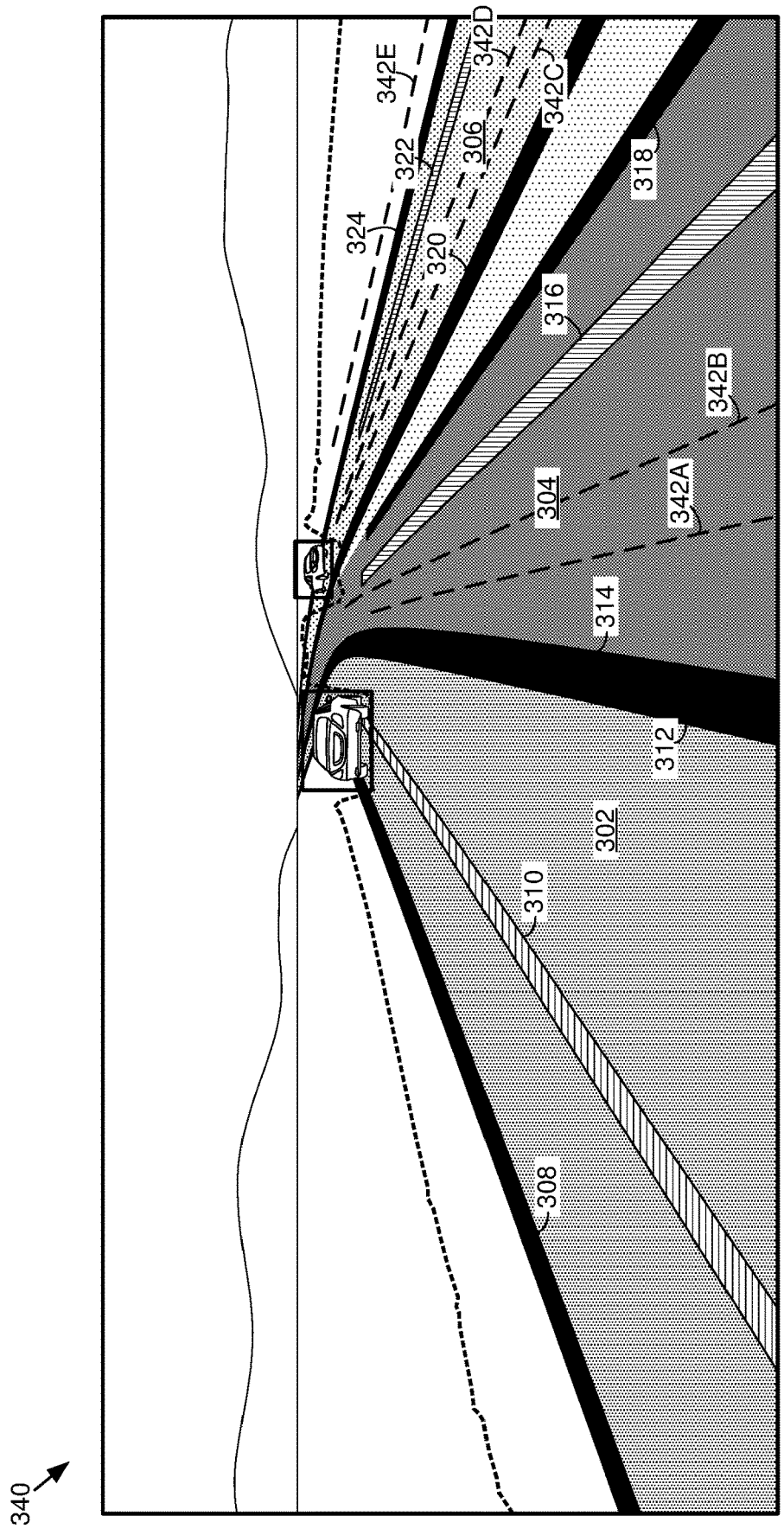
FIG. 3B is another example visualization of an aggregate lane representation with medium confidence, in accordance with some embodiments of the present disclosure.

Now referring to FIG. 3B, FIG. 3B is another example visualization 340 of an aggregate lane representation with medium confidence, in accordance with some embodiments of the present disclosure. The visualization 340 of FIG. 3B may include similar lanes 302, 304, and 306 as FIG. 3A, and similar labels or classification, but the lanes 304 and 306 may be predicted with a lower confidence (as indicated by the diagonal pattern along the lane rails, as compared to the horizontal pattern along the lane rail of lane 302). For example, additional representations of polylines 342A and 342B are included in the visualization 340 to illustrate the disparity between the polylines from the lane graphs 112 and the impact that may have had on the confidence for final polylines corresponding to the lane 304. Similarly, additional representations of polylines 342C, 342D, and 342E are included in the visualization 340 to illustrate the disparity between the polylines from the lane graphs 112 and the impact they may have had on the confidence for final polylines corresponding to the lane 306. Although the polylines from the lane graphs 112 may not have generated as high a confidence for the lanes 304 and 306 as in FIG. 3A, the aggregate lane graph 124 may still be relied upon for autonomous or ADAS driving functionality, but the lower confidence may be taken into account when navigating the environment.

Figure 3C:
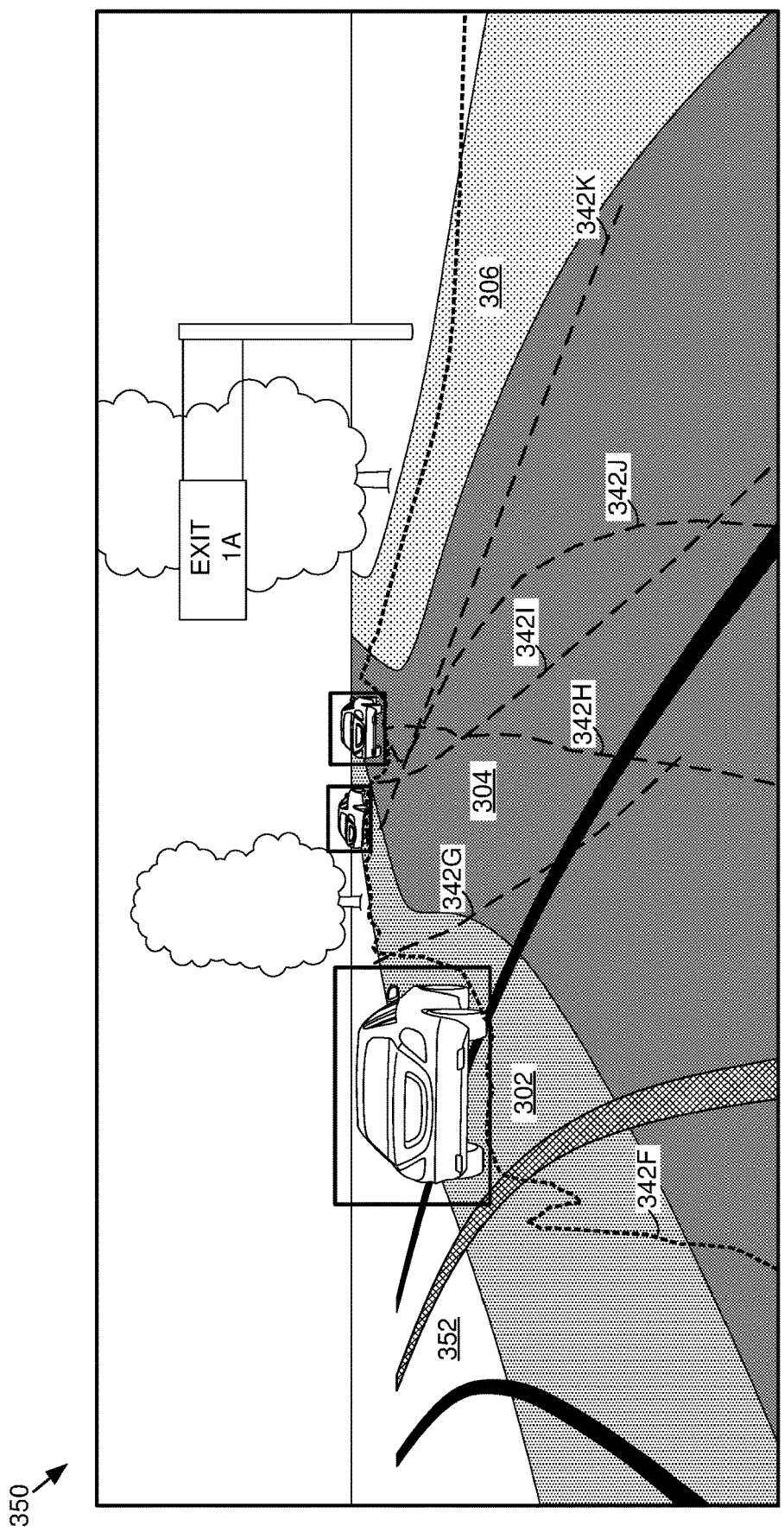
FIG. 3C is another example visualization of an aggregate lane representation with low confidence, in accordance with some embodiments of the present disclosure.

FIG. 3C is another example visualization 350 of an aggregate lane representation with low confidence, in accordance with some embodiments of the present disclosure. The visualization 350 of FIG. 3C may include similar lanes 302, 304, and 306 as FIG. 3A, but the aggregate lane graph 124 may only include a prediction of a single lane 352 that may not actually correspond to one of the lanes 302, 304, or 306. As a result, the single lane 352 may be predicted with a very low confidence, and thus may cause disengagement of autonomous driving functionality, a fallback to an individual lane or path perception output source (e.g., object trace(s) 108, as represented by the object trace 354, for example), and/or ignoring or disregarding the aggregate lane graph 124 for the current iteration. The visualization 350 includes additional representations of polylines 342F, 342G, 342H, 342I, 342J, and 342K are to illustrate the disparity between the polylines from the lane graphs 112 that may have contributed to the low confidence output for the current iteration of the aggregate lane graph 124.

Figure 4:
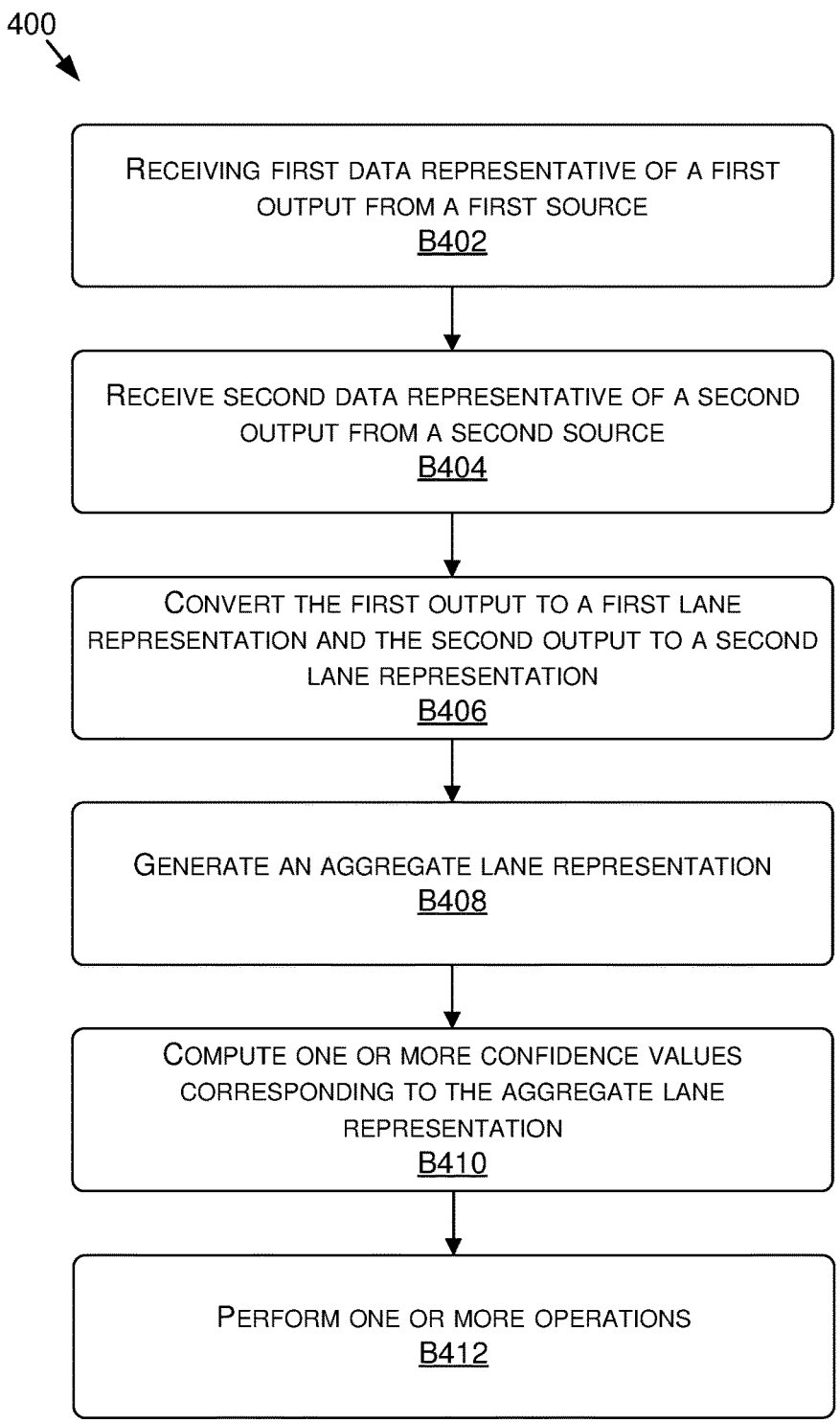
FIG. 4 is a flow diagram showing a method of generating an aggregate lane representation, in accordance with some embodiments of the present invention.

Now referring to FIG. 4, each block of method 400, described herein, comprises a computing process that may be performed using any combination of hardware, firmware, and/or software. For instance, various functions may be carried out by a processor executing instructions stored in memory. The method 400 may also be embodied as computer-usable instructions stored on computer storage media. The method 400 may be provided by a standalone application, a service or hosted service (standalone or in combination with another hosted service), or a plug-in to another product, to name a few. In addition, method 400 is described, by way of example, with respect to the process 100 of FIG. 1 and the vehicle 700 of FIGS. 7A-7D. However, this method may additionally or alternatively be executed within any one process and/or by any one system, or any combination of processes and/or systems, including, but not limited to, those described herein.

FIG. 4 is a flow diagram showing a method of generating an aggregate lane representation, in accordance with some embodiments of the present invention. The method 400, at block B402, includes receiving first data representative of a first output from a first source. For example, first data representative of a first output from a perception source—such as a DNN(S) 104, an HD map(s) 106, and/or an object trace 108—may be generated and/or received.

The method 400, at block B404, includes receiving second output representative of a second output from a second source. For example, second data representative of a second output from another perception source—such as a DNN(S) 104, an HD map(s) 106, and/or an object trace 108—may be generated and/or received.

The method 400, at block B406, includes converting the first output to a first lane representation and the second output to a second lane representation. For example, the first (pre-processed, in embodiments) output may be used to generate a first lane graph 112 and the second output may be used to generate a second lane graph 112.

The method 400, at block B408, includes generating an aggregate lane representation. For example, at least the first lane graph 112 and the second lane graph 112 may be applied to the lane graph aggregator 114 to generate the aggregate lane graph 124.

The method 400, at block B410, includes computing one or more confidence values corresponding to the aggregate lane representation. For example, one or more confidence values may be computed—by the confidence estimator 120—and assigned to one or more points and/or segments of the final polylines of the aggregate lane representation.

The method 400, at block B412, includes performing one or more operations. For example, the vehicle component(s) 126 of the vehicle 700 may perform one or more operations based at least in part on the aggregate lane graph 124 and/or the confidence value(s) associated therewith.

Figure 5:
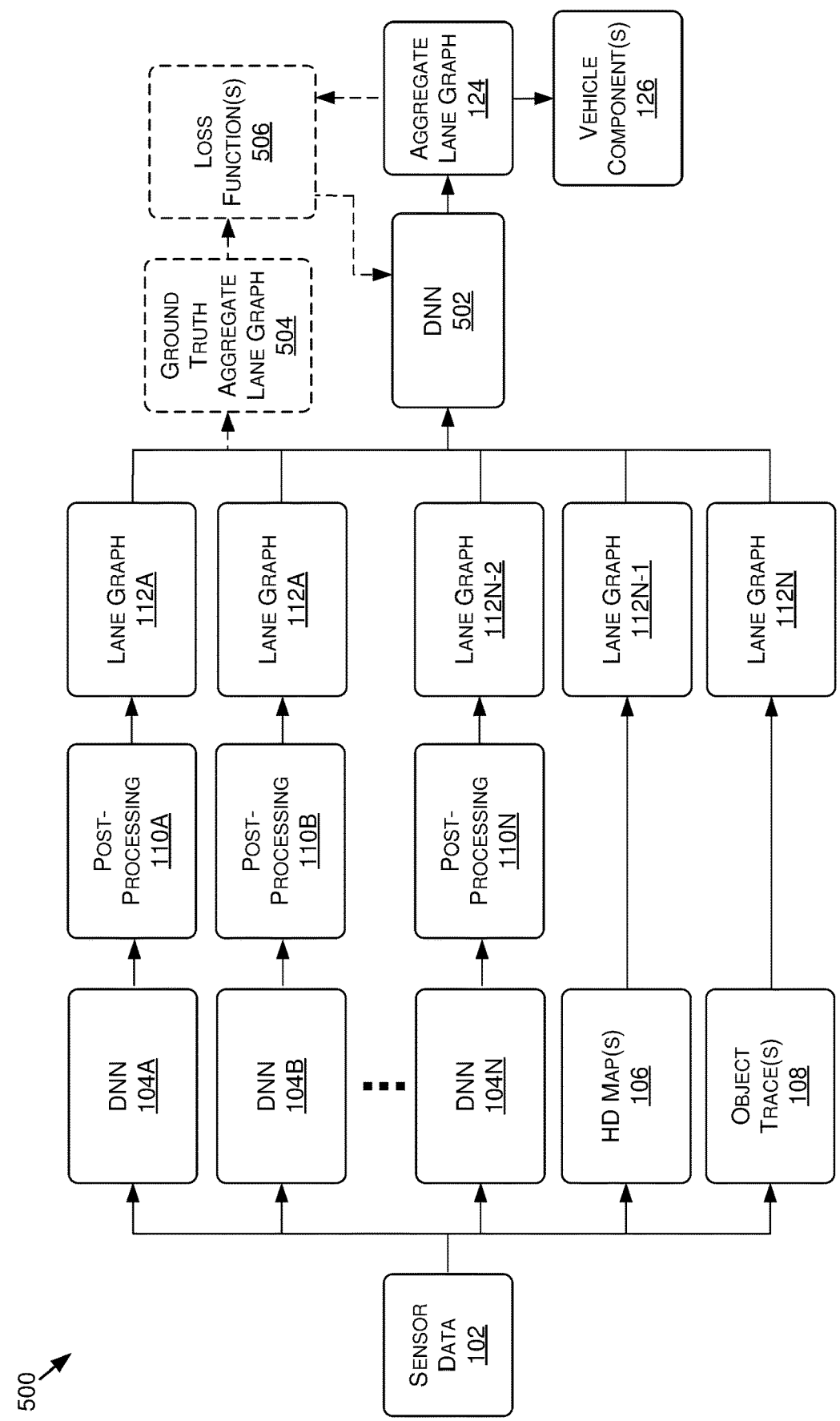
FIG. 5 is a data flow diagram for an example process of generating an aggregate lane representation from a plurality of individually generated lane representations using a deep neural network (DNN), in accordance with some embodiments of the present disclosure.

FIG. 5 is a data flow diagram for a process 500 of generating an aggregate lane representation from a plurality of individually generated lane representations using a deep neural network (DNN), in accordance with some embodiments of the present disclosure. The process 500 may be similar to that of the process 100 of FIG. 1, but may use a DNN 502 to generate an aggregate lane graph 124 rather than the lane graph aggregator 114 described herein. The DNN 502 may include, for example, and without limitation, any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

The DNN 502—during training, as indicated by the dashed lines—may be trained to predict the aggregate lane graph 124 using ground truth aggregate lane graphs 504 as ground truth data. In some non-limiting embodiments, the ground truth aggregate lane graphs 504 may be generated using the lane graph aggregator 114 as described herein. As such, when the lane graphs 112A-112N are applied to the DNN 502, the aggregate lane graph 124 as predicted by the DNN 502 may be compared against the ground truth aggregate lane graph 504—using one or more loss functions 506—and the results of the comparison may be used to update parameters or coefficients (e.g., weights and biases) of the DNN 502. This process may be repeated until the predictions of the DNN 502 converge to acceptable or desirable levels of accuracy—e.g., until the loss is minimized.

Once fully trained, the DNN 502 may be deployed (and alternatively referred to herein as a "deployed DNN 502" or a "deployed neural network 502"). The deployed DNN 502 may then receive data representative of the lane graphs 112A-112N as inputs, and compute the aggregate lane graph 124. The computed aggregate lane graph 124—similar to that of the aggregate lane graph 124 in FIG. 1—may include associated confidences for points or segments of the final polylines of the aggregate lane graph 124. The aggregate lane graph 124 may then be used by the vehicle component (s) 126 to perform one or more operations, such as but not limited to those described herein.

Figure 6:
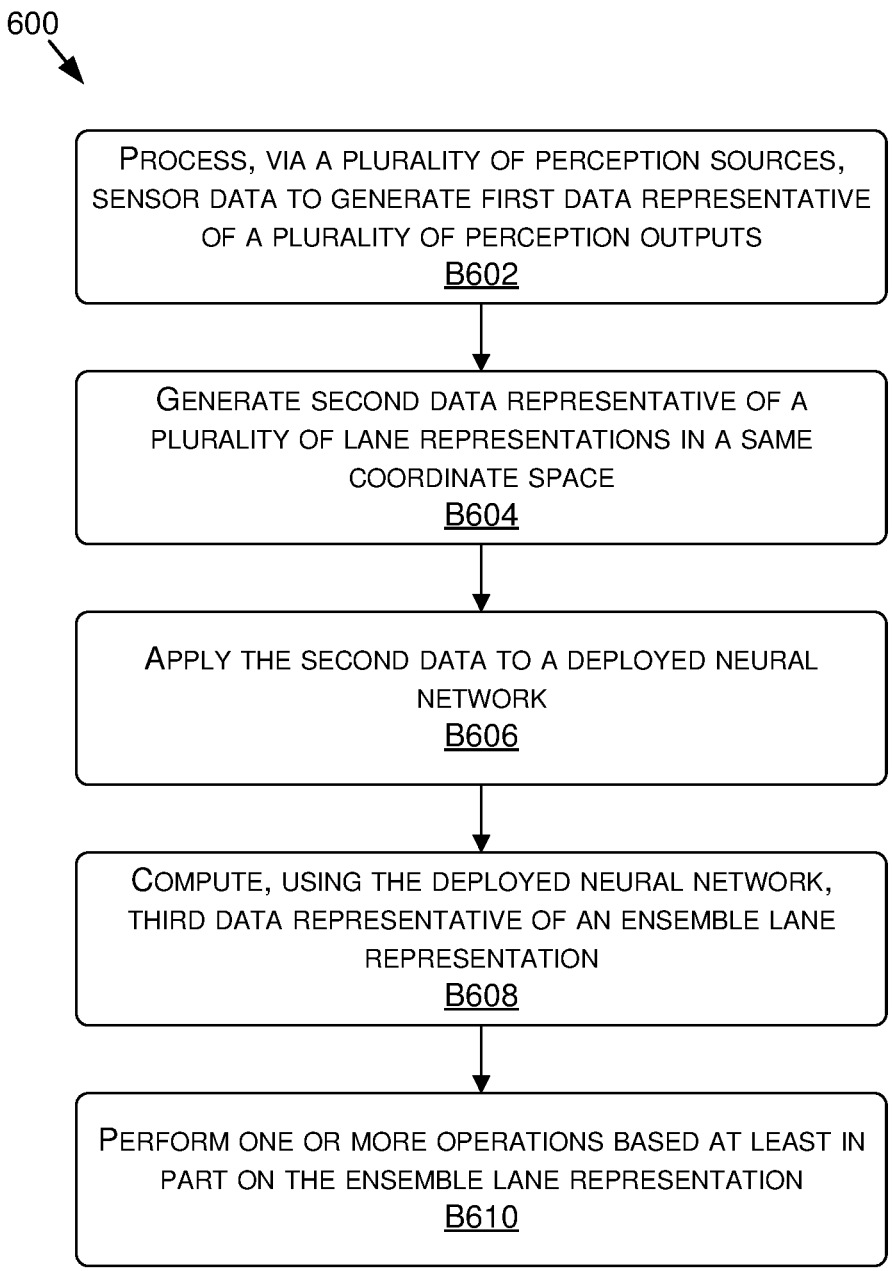
FIG. 6 is a flow diagram showing an example method of generating an aggregate lane representation using a DNN, in accordance with some embodiments of the present disclosure.

Now referring to FIG. 6, each block of method 600, described herein, comprises a computing process that may be performed using any combination of hardware, firmware, and/or software. For instance, various functions may be carried out by a processor executing instructions stored in memory. The method 600 may also be embodied as computer-usable instructions stored on computer storage media. The method 600 may be provided by a standalone application, a service or hosted service (standalone or in combination with another hosted service), or a plug-in to another product, to name a few. In addition, method 400 is described, by way of example, with respect to the process 500 of FIG. 5 and the vehicle 700 of FIGS. 7A-7D. However, this method 600 may additionally or alternatively be executed within any one process and/or by any one system, or any combination of processes and/or systems, including, but not limited to, those described herein.

FIG. 6 is a flow diagram showing a method of generating an aggregate lane representation using a DNN, in accordance with some embodiments of the present disclosure. The method 600, at block B602, includes processing, via a plurality of perception sources, sensor data to generate first data representative of a plurality of perception outputs. For example, the perception sources—e.g., the DNN(s) 104, the HD map(s) 106, and/or the object trace(s) 108—may process the sensor data 102 to generate the perception outputs.

The method 600, at block B604, includes generating second data representative of a plurality of lane representations in a same coordinate space. For example, the perception outputs may be used—after post-processing, in embodiments—to generate the lane graphs 112A-112N in a same coordinate space (e.g., top-down world-space coordinate system, 2D or 3D world-space coordinate system, 2D image space coordinates, and/or another coordinate system).

The method 600, at block B606, includes applying the second data to a deployed neural network. For example, data representative of the lane graphs 112A-112N may be applied to the deployed DNN 502.

The method 600, at block B608, includes computing, using the deployed neural network, third data representative of an ensemble lane representation. For example, the deployed DNN may compute data representative of the aggregate lane graph 124 based at least in part on processing the lane graphs 112A-112N.

The method 600, at block B610, includes performing one or more operations based at least in part on the ensemble lane representation. For example, the vehicle 700 may perform one or more operations based at least in part on the aggregate lane graph 124.

Example Autonomous Vehicle

Figure 7A:
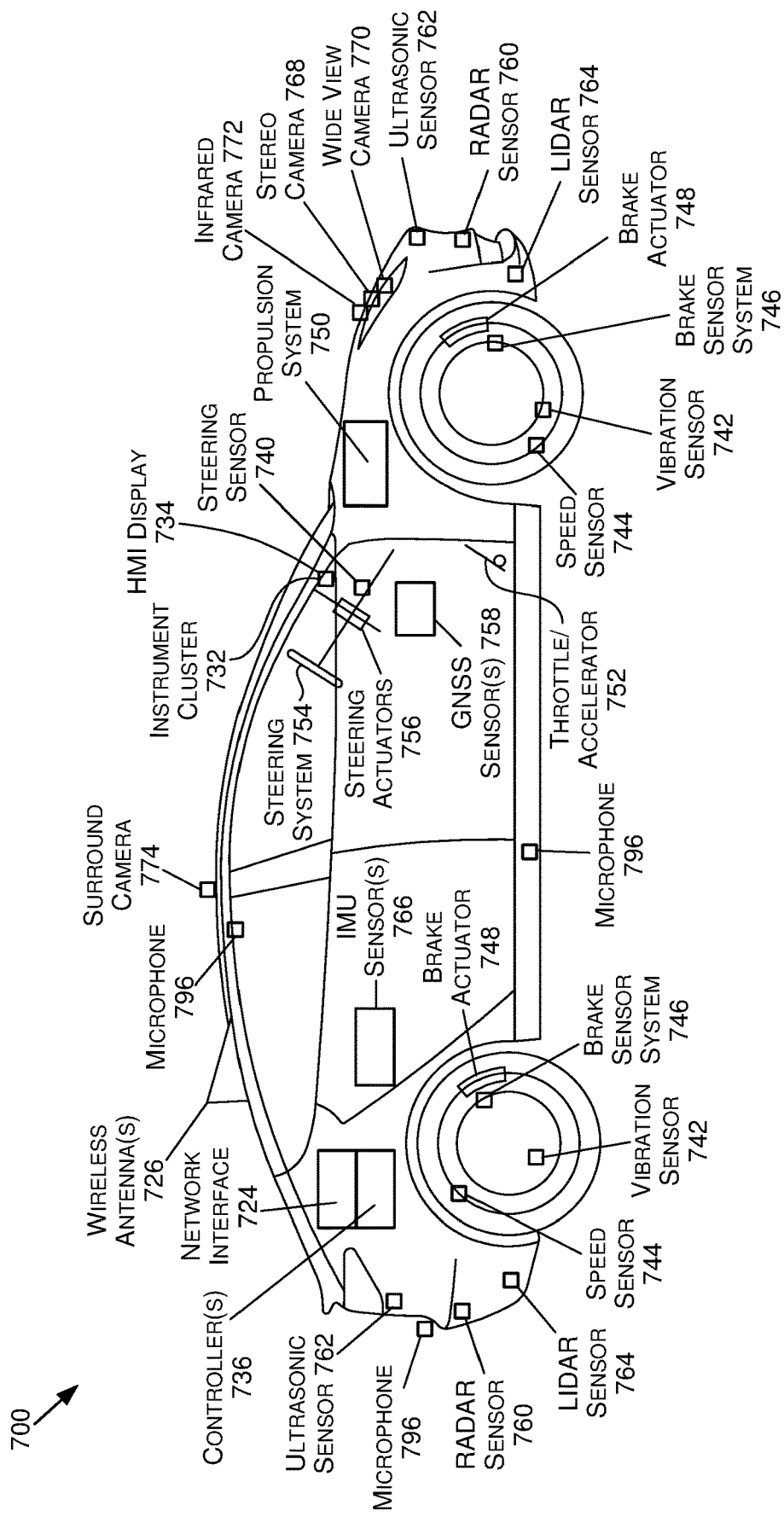
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 5 of the autonomous driving levels. For example, the vehicle 700 may be capable of conditional automation (Level 3), high automation (Level 4), and/or full automation (Level 5), depending on the embodiment.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), and/or other sensor types.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the HD map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over LTE, WCDMA, UMTS, GSM, CDMA2000, etc. The wireless antenna(s) 726 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 7B:
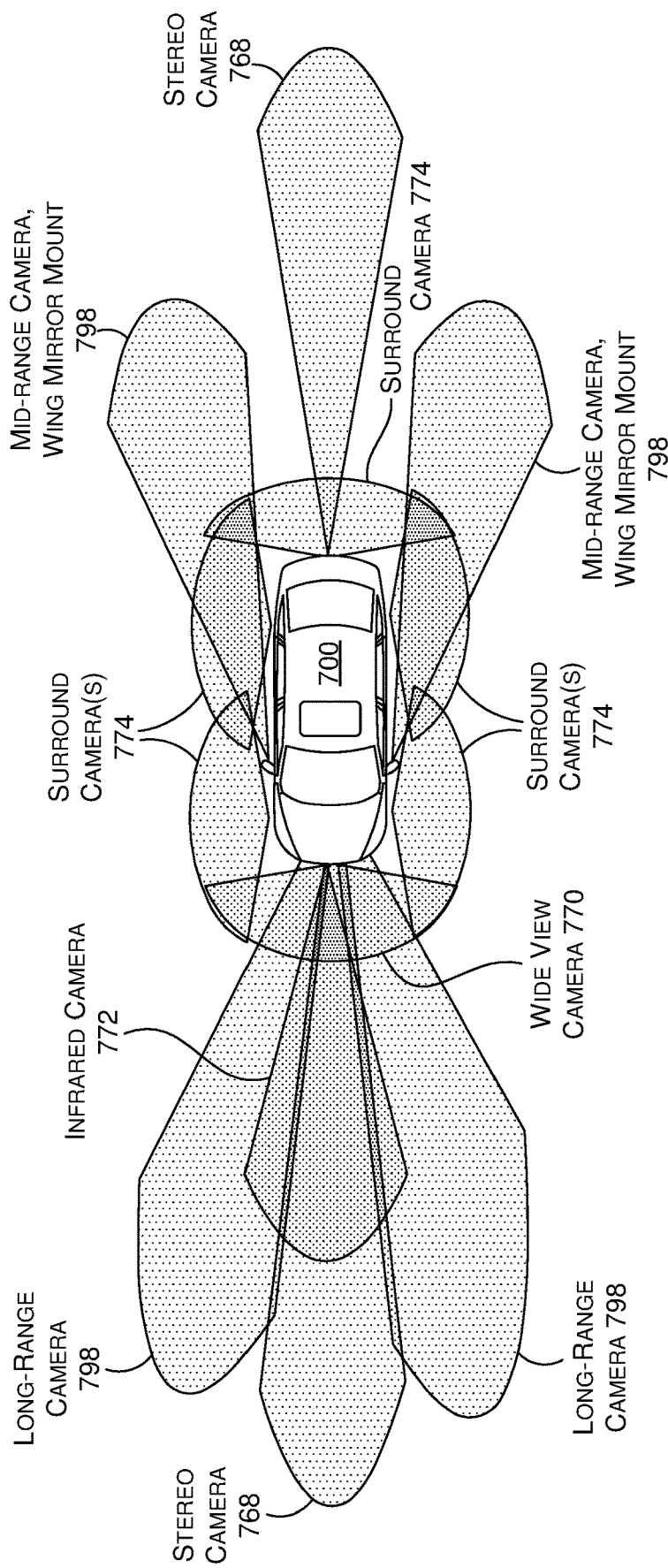
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 720 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may any number of wide-view cameras 770 on the vehicle 700. In addition, long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

One or more stereo cameras 768 may also be included in a front-facing configuration. The stereo camera(s) 768 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Figure 7C:
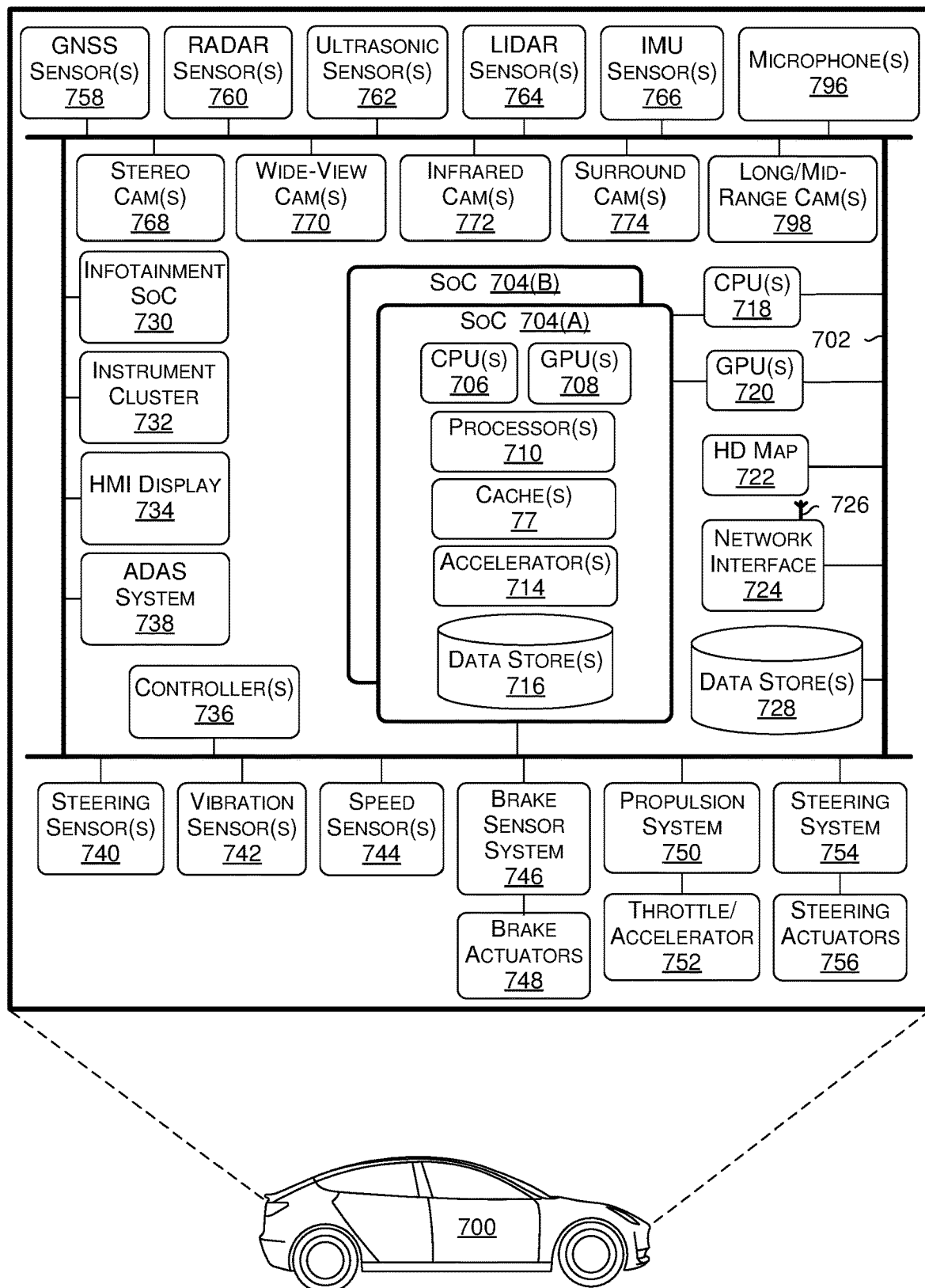
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real0time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 712 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS and/or assisted GPS sensors), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 700 m, with an accuracy of 2 cm-3 cm, and with support for a 700 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 720-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
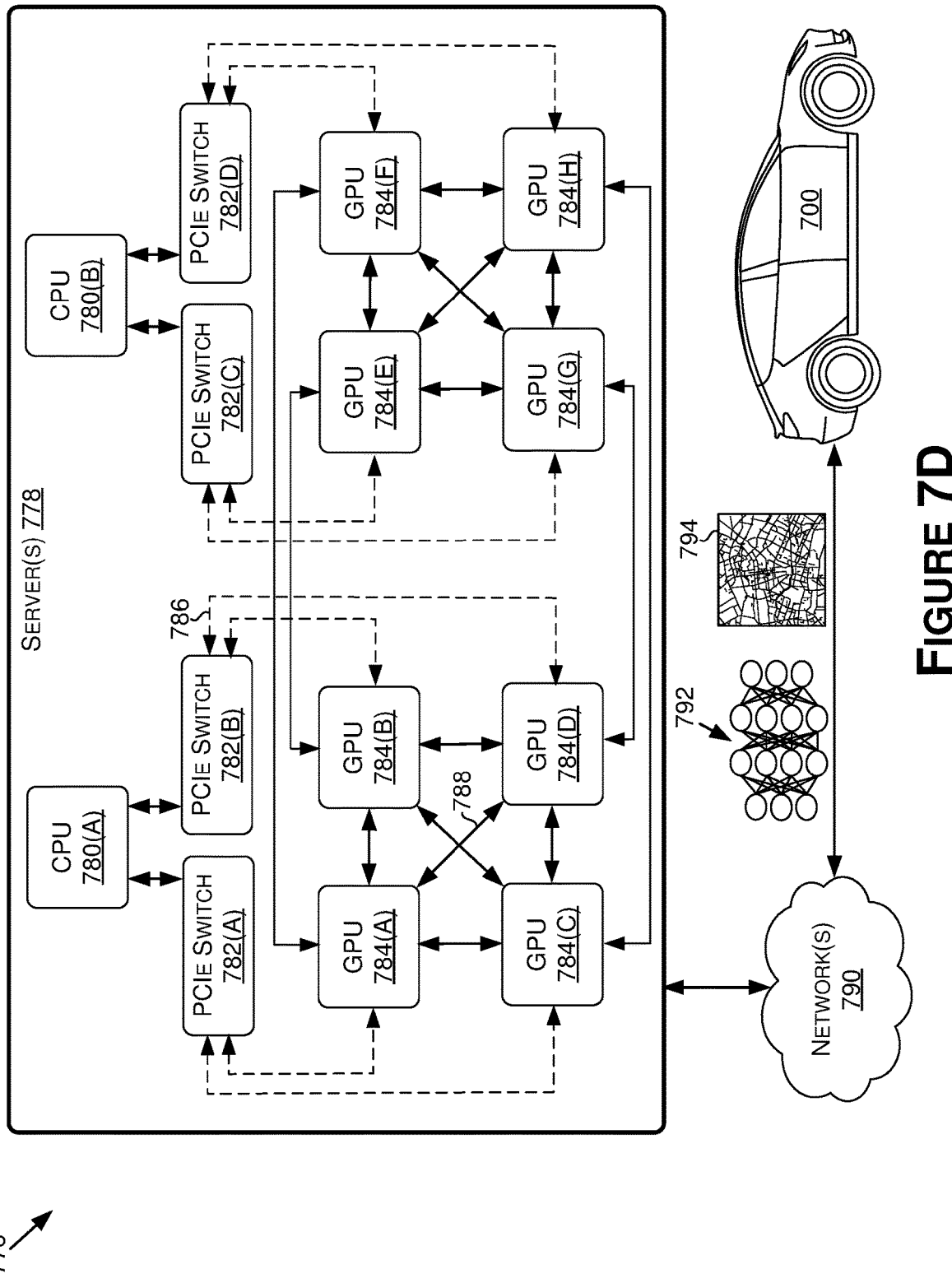
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(H) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
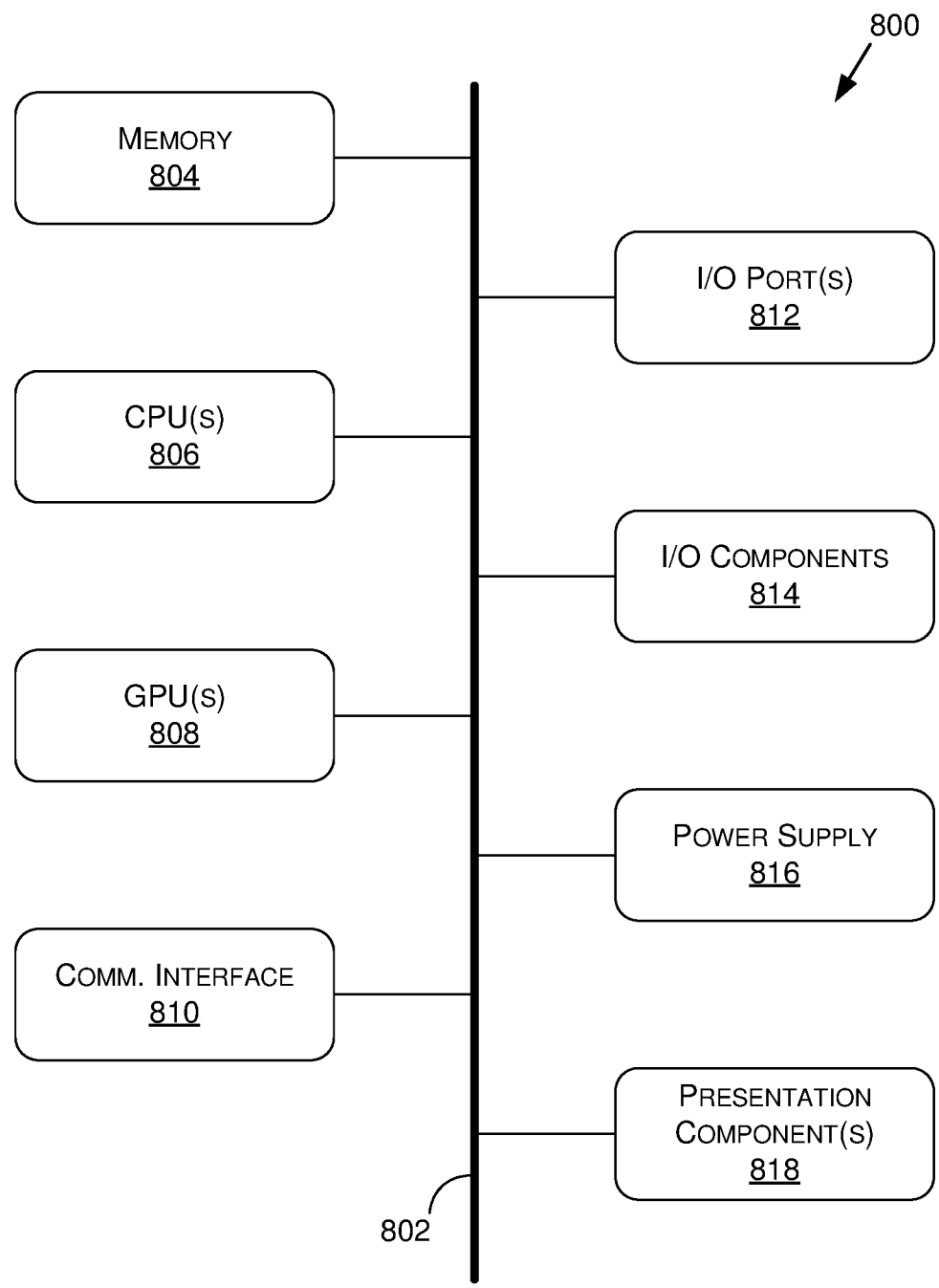
FIG. 8 is a block diagram of an example computing device suitable for use in implementing some embodiments of the present disclosure.

FIG. 8 is a block diagram of an example computing device 800 suitable for use in implementing some embodiments of the present disclosure. Computing device 800 may include a bus 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, and one or more presentation components 818 (e.g., display(s)).

Although the various blocks of FIG. 8 are shown as connected via the bus 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The bus 802 may represent one or more busses, such as an address bus, a data bus, a control bus, or a combination thereof. The bus 802 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 806 may be configured to execute the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an ARM processor implemented using Reduced Instruction Set Computing (RISC) or an X86 processor implemented using Complex Instruction Set Computing (CISC). The computing device 800 may include one or more CPUs 806 in addition to one or more microprocessors or supplementary co-processors, such as math co-processors.

The GPU(s) 808 may be used by the computing device 800 to render graphics (e.g., 3D graphics). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data. The display memory may be included as part of the memory 804. The GPU(s) 708 may include two or more GPUs operating in parallel (e.g., via a link) When combined together, each GPU 808 may generate pixel data for different portions of an output image or for different output images (e.g., a first GPU for a first image and a second GPU for a second image). Each GPU may include its own memory, or may share memory with other GPUs.

In examples where the computing device 800 does not include the GPU(s) 808, the CPU(s) 806 may be used to render graphics.

The communication interface 810 may include one or more receivers, transmitters, and/or transceivers that enable the computing device 700 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   receiving first data representative of a first output from a first source generated based at least in part on first sensor data generated using one or more first sensors of a vehicle;
   receiving second data representative of a second output from a second source generated based at least in part on second sensor data generated using one or more second sensors of the vehicle;
   converting the first output to a first lane representation and the second output to a second lane representation, the first lane representation and the second lane representation being represented in a same coordinate system;
   generating an aggregate lane representation based at least in part on the first lane representation and the second lane representation;
   computing one or more confidence values corresponding to the aggregate lane representation based at least in part on a level of agreement between the first lane representation and the second lane representation; and
   performing one or more operations by the vehicle based at least in part on the aggregate lane representation and the one or more confidence values.

2. The method of claim 1, wherein each of the first source and the second source includes at least one of a machine learning model, a deep neural network (DNN), a high-definition (HD) map, or an object trace.

3. The method of claim 1, wherein each of the first output and the second output includes at least one of a future trajectory for the vehicle, a location of at least one lane rail corresponding to at least one lane, or a location of at least one lane edge corresponding to at least one lane.

4. The method of claim 1, wherein the same coordinate system includes a world-space coordinate system with an origin corresponding to a location of the vehicle.

5. The method of claim 1, wherein the converting the first output to the first lane representation and the second output to the second lane representation includes:
   generating, based at least in part on the first output, a first set of polylines corresponding to at least one of a lane rail or one or more edges of at least one lane; and
   generating, based at least in part on the second output, a second set of polylines corresponding to the at least one of the lane rail or the one or more edges of the at least one lane.

6. The method of claim 5, wherein the converting the first output to the first lane representation and the second output to the second lane representation further includes assigning a line classification to each of the first set of polylines and the second set of polylines, the line classification determined based at least in part on at least one of a first set of line classifications associated with the first output and the second output or an analysis of geometrical relationships between the first set of polylines and the second set of polylines.

7. The method of claim 1, wherein the generating the aggregate lane representation includes:
   determining, from a first set of polylines corresponding to the first lane representation and a second set of polylines corresponding to the second lane representation, a subset of polylines associated with a same line classification;
   computing distances between pairs of polylines from the subset of polylines;
   clustering the subset of polylines based at least in part on the distances to generate polyline clusters;
   determining a number of polylines associated with each cluster of the polyline clusters; and
   generating the aggregate lane representation based at least in part on the subset of polylines within a cluster of the polyline clusters having the greatest number of polylines.

8. The method of claim 7, wherein the computing the one or more confidence values includes determining a number of sources out of at least one of the first source or the second source that accounted for the subset of polylines within the cluster.

9. The method of claim 1, wherein the computing the one or more confidence values includes:
   computing a first confidence value corresponding to a first segment of the aggregate lane representation and a second confidence value corresponding to a second segment of the aggregate lane representation,
   wherein the performing the one or more operations is based at least in part on the first confidence value and the second confidence value.

10. The method of claim 1, wherein the generating the aggregate lane representation includes weighting a current aggregate lane representation against one or more prior aggregate lane representations.

11. A system comprising:
   one or more sensors to generate sensor data; and
   one or more processing unit comprising processing circuitry to:

generate data representative of a plurality of perception outputs based at least in part on applying at least a portion of the sensor data to each of a plurality of perception sources;

generate a plurality of lane graphs in a same coordinate space based at least in part on the data, each lane graph of the plurality of lane graphs corresponding to a respective perception source of the perception sources;

generate an aggregate lane graph based at least in part on the plurality of lane graphs;

determine confidences corresponding to one or more portions of the aggregate lane graph; and perform one or more operations based at least in part on the aggregate lane graph and the confidences.

12. The system of claim 11, wherein the plurality of perception sources include at least one of a high-definition (HD) map, a deep neural network (DNN), or an object trace.

13. The system of claim 11, wherein the processing circuitry is further to associate the confidences with the one or more portions of the aggregate lane graph.

14. The system of claim 11, wherein the generation of the aggregate lane graph comprises:
determining a subset of polylines from the plurality of lane graphs associated with a same line classification;
computing distances between pairs of polylines from the subset of polylines;
clustering the subset of polylines based at least in part on the distances to generate polyline clusters;
determining an intra-cluster variance for each cluster of the polyline clusters; and
generating the aggregate lane graph based at least in part on the subset of polylines within a cluster of the polyline clusters having a lowest associated intra-cluster variance.

15. The system of claim 14, wherein the determination of the confidences including determining a number of perception sources from the plurality of perception sources that accounted for the subset of polylines within the cluster of the polyline clusters having the lowest associated intra-cluster variance.

16. The system of claim 11, wherein the plurality of perception outputs include at least one of a future trajectory for a vehicle having the one or more sensors disposed thereon, a location of at least one lane rail corresponding to at least one lane, or a location of at least one lane edge corresponding to at least one lane.

17. A method comprising:
processing, via a plurality of perception sources, sensor data generated by one or more sensors of a vehicle to generate first data representative of a plurality of perception outputs corresponding to a driving surface of the vehicle;
generating, based at least in part on the first data, second data representative of a plurality of lane representations in a same coordinate space, each lane representation of the plurality of lane representations corresponding to a respective perception source of the plurality of perception sources;
applying the second data to a deployed neural network;
computing, using the deployed neural network and based at least in part on the second data, third data representative of an ensemble lane representation; and
performing one or more operations by the vehicle based at least in part on the ensemble lane representation.

18. The method of claim 17, wherein:
the plurality of perception sources include at least one of a deep neural network (DNN), a high-definition (HD) map, or an object trace; and
the plurality of perception outputs include at least one of a future trajectory for the vehicle, a location of at least one lane rail corresponding to at least one lane, or a location of at least one lane edge corresponding to at least one lane.

19. The method of claim 17, further comprising:
computing, using the deployed neural network, fourth data representative of at least one confidence value corresponding to the ensemble lane representation,
wherein the performing the one or more operations is further based at least in part on the at least one confidence.

20. The method of claim 17, wherein the deployed neural network is trained using ground truth ensemble lane representations, each ground truth ensemble lane representation generated, at least in part, by:
determining, from a first set of polylines corresponding to a first lane representation from a first perception source and a second set of polylines corresponding to a second lane representation from a second perception source, a subset of polylines associated with a same line classification;
computing distances between pairs of polylines from the subset of polylines;
clustering the subset of polylines based at least in part on the distances to generate polyline clusters;
determining a number of polylines associated with each cluster of the polyline clusters; and
generating the ensemble lane representation based at least in part on the subset of polylines within a cluster of the polyline clusters having the number that is the greatest.

\* \* \* \* \*